(12) United States Patent
Song et al.

(10) Patent No.: US 12,001,745 B2
(45) Date of Patent: Jun. 4, 2024

(54) ELECTRONIC CUTTING BOARD, WIRELESS POWER TRANSMISSION APPARATUS AND COOKING MANAGEMENT METHOD USING THE WIRELESS POWER TRANSMISSION APPARATUS

(71) Applicant: SAMSUNG ELECTRONICS CO., LTD., Suwon-si (KR)

(72) Inventors: Sunghyun Song, Suwon-si (KR); Hyeongseong Kim, Suwon-si (KR); Nooree Na, Suwon-si (KR); Taehyoung Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/692,527

(22) Filed: Mar. 11, 2022

(65) Prior Publication Data
US 2022/0291889 A1      Sep. 15, 2022

Related U.S. Application Data

(63) Continuation of application No. PCT/KR2022/003472, filed on Mar. 11, 2022.

(30) Foreign Application Priority Data

Mar. 12, 2021   (KR) .................. 10-2021-0032996

(51) Int. Cl.
*G06F 3/14*      (2006.01)
*A47J 47/00*     (2006.01)
(Continued)

(52) U.S. Cl.
CPC .............. *G06F 3/14* (2013.01); *A47J 47/005* (2013.01); *G01G 19/414* (2013.01); *G01G 19/52* (2013.01);
(Continued)

(58) Field of Classification Search
None
See application file for complete search history.

(56) References Cited

U.S. PATENT DOCUMENTS

| 7,969,330 B2 | 6/2011 | Phlipp |
| 10,303,947 B2 | 5/2019 | Kubotani et al. |

(Continued)

FOREIGN PATENT DOCUMENTS

| CN | 110338681 A | 10/2019 |
| JP | 2012-53074 | 3/2012 |

(Continued)

OTHER PUBLICATIONS

English machine translation of Korean patent publication KR-2014-0010609 A (Year: 2014).*

(Continued)

*Primary Examiner* — Nicholas J Lee
(74) *Attorney, Agent, or Firm* — STAAS & HALSEY LLP

(57) ABSTRACT

An electronic cutting board which includes a power receiver configured to receive power from a wireless power transmission apparatus, a communication circuitry configured to communicate with the wireless power transmission apparatus, a plate including a display and a protective cover provided to protect the display, a weight sensor configured to measure a weight of an object while the object is placed on the plate, and a controller configured to control the display to display a cutting guide based on the measured weight.

15 Claims, 33 Drawing Sheets

(51) Int. Cl.
*G01G 19/414* (2006.01)
*G01G 19/52* (2006.01)
*G01G 23/18* (2006.01)
*H02J 50/12* (2016.01)
*H02J 50/40* (2016.01)

(52) U.S. Cl.
CPC .............. *G01G 23/18* (2013.01); *H02J 50/12* (2016.02); *H02J 50/402* (2020.01)

(56) References Cited

U.S. PATENT DOCUMENTS

| | | |
|---|---|---|
| 10,394,335 B2 | 8/2019 | Tanabe et al. |
| 11,150,126 B2 | 10/2021 | Wallace et al. |
| 2014/0332289 A1* | 11/2014 | Gallagher, Jr. .... G01G 23/3735 177/1 |
| 2014/0334691 A1 | 11/2014 | Cho et al. |
| 2016/0182864 A1 | 6/2016 | Izawa et al. |

FOREIGN PATENT DOCUMENTS

| | | |
|---|---|---|
| JP | 2012-120791 | 6/2012 |
| JP | 5758368 | 8/2015 |
| JP | 6062596 | 1/2017 |
| JP | 2019-525825 | 10/2019 |
| JP | 7001991 | 1/2022 |
| KR | 10-2013-0138402 | 12/2013 |
| KR | 10-2014-0010609 | 1/2014 |
| KR | 10-2016-093831 A | 8/2016 |
| KR | 10-1708450 B1 | 2/2017 |
| KR | 10-1759299 B1 | 7/2017 |
| KR | 10-1851914 B1 | 4/2018 |
| KR | 10-2018-0050312 A | 5/2018 |
| KR | 10-2018-0085319 | 7/2018 |
| KR | 10-1907658 B1 | 10/2018 |
| KR | 20-2019-0000908 U | 4/2019 |
| KR | 10-2020-0051973 | 5/2020 |
| KR | 10-2020-0144954 | 12/2020 |
| WO | WO-2018024913 A1 * | 2/2018 ............... A23L 5/00 |

OTHER PUBLICATIONS

English machine translation of Korean patent publication KR-2016-0093831 A (Year: 2016).*
PCT/IDS/210 dated Jul. 6, 2022 in International Patent Application No. PCT/KR2022/003472 (4 pages).
Office Action dated Mar. 25, 2024 issued in European Application No. 22767566.7.

* cited by examiner

FIG. 29
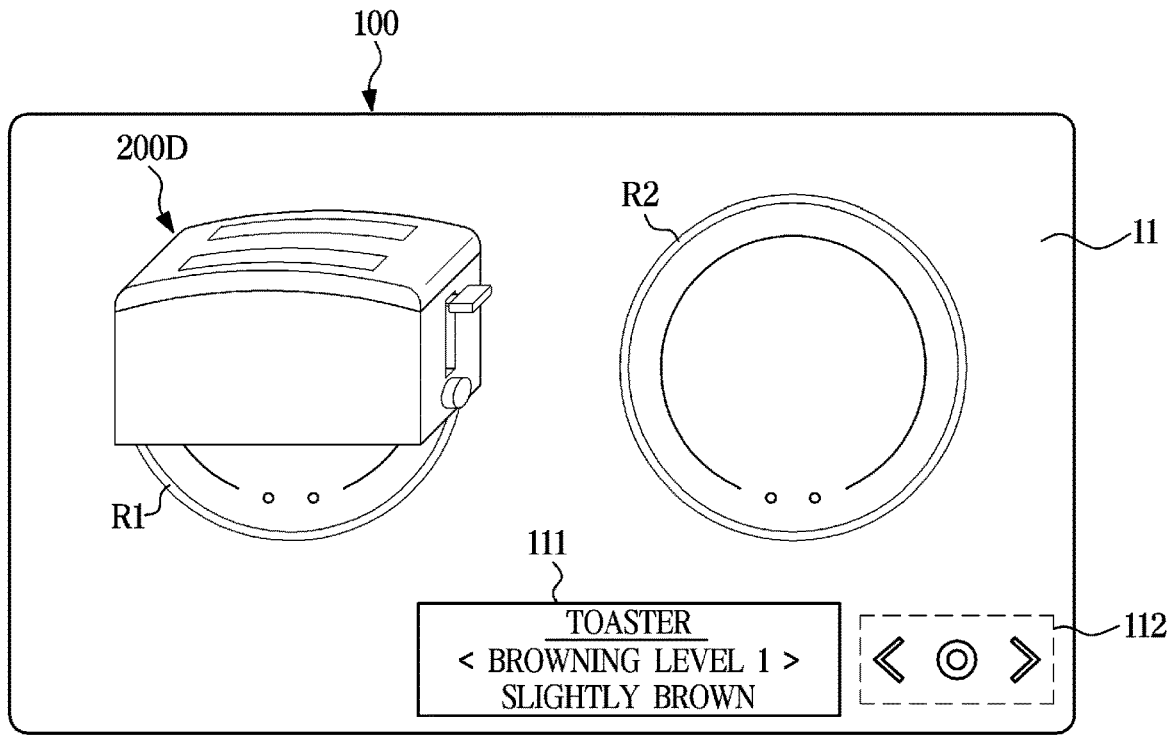
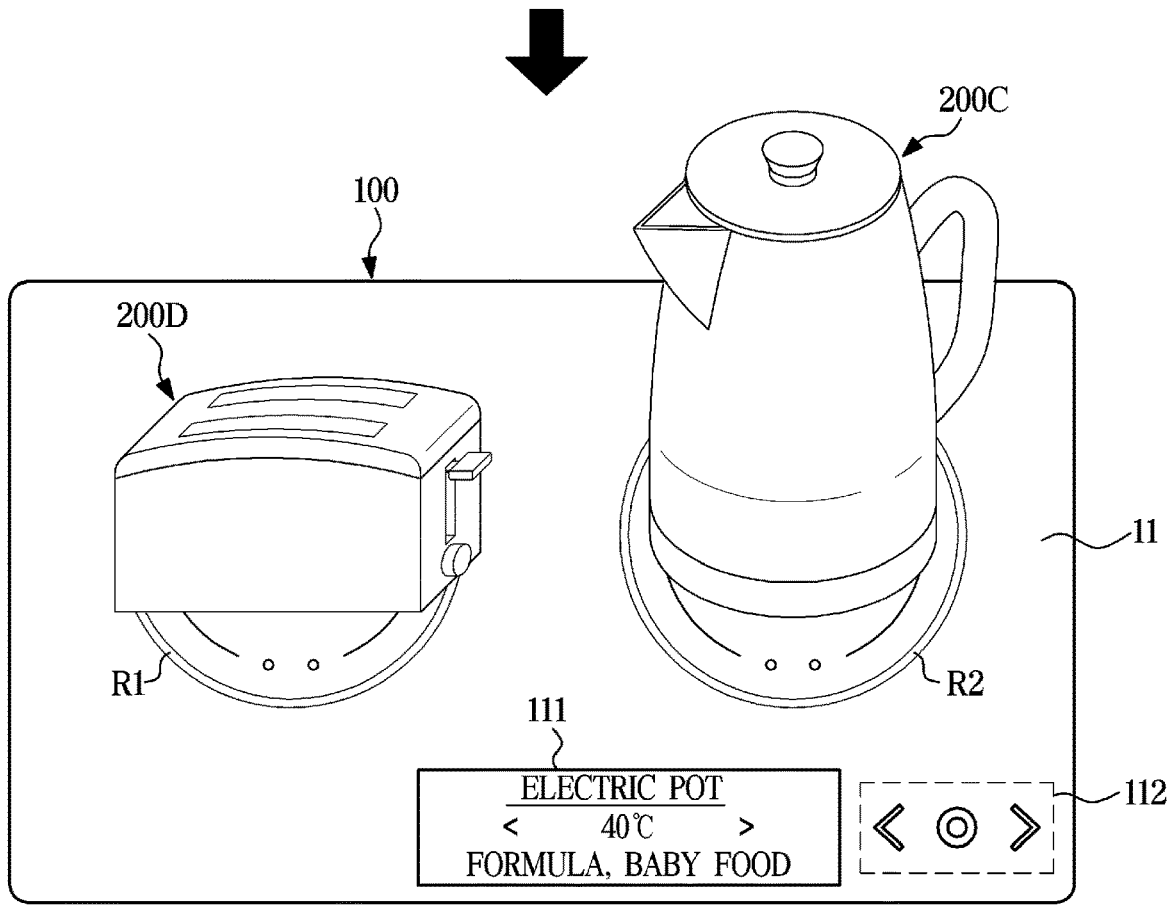

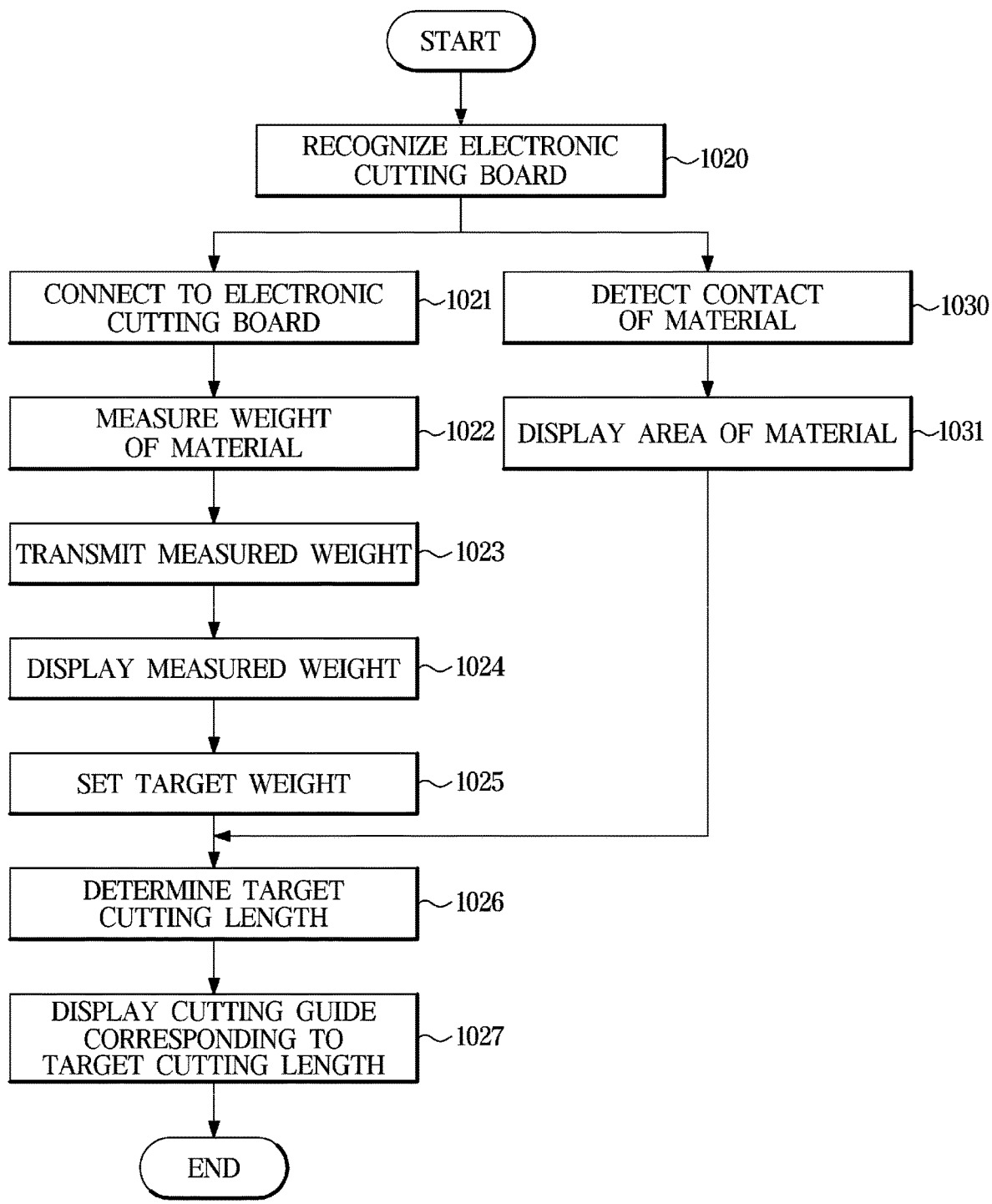

ELECTRONIC CUTTING BOARD, WIRELESS POWER TRANSMISSION APPARATUS AND COOKING MANAGEMENT METHOD USING THE WIRELESS POWER TRANSMISSION APPARATUS

CROSS-REFERENCE TO RELATED APPLICATION(S)

This application is a continuation application, under 35 U.S.C. § 111(a), of International Patent Application No. PCT/KR2022/003472, filed on Mar. 11, 2022, which claims the benefit of Korean Patent Application No. 10-2021-0032996, filed on Mar. 12, 2021, in the Korean Intellectual Property Office, the entire disclosures of which are herein incorporated by reference as a part of this application.

BACKGROUND

1. Field

The disclosure relates to an electronic cutting board configured to receive power and recipe information from a wireless power transmission apparatus, the wireless power transmission apparatus connected to a mobile device and the electronic cutting board, and a cooking management method using the wireless power transmission apparatus.

2. Description of Related Art

Recently, a technology for supplying wireless power has been developed and been applied to many electronic devices. Electronic devices to which the wireless power transmission technology is applied may not require a direct connection to a charging connector, and may receive power wirelessly.

The wireless power transmission technology includes a magnetic induction method using a magnetic induction phenomenon between a primary coil and a secondary coil, and a magnetic resonance method in which a primary coil and a secondary coil use the same frequency.

Also, in recent years, the use of induction, which is a cooking device that heats a cooking vessel using a magnetic induction phenomenon, has increased. If the heating principle of induction is applied to wireless power transmission, it is expected that supplying power to home appliances and heating the cooking vessel are simultaneously performed with a single device so as to manage the entire cooking process.

SUMMARY

In accordance with an aspect of the disclosure, an electronic cutting board includes a power receiver configured to receive power from a wireless power transmission apparatus, a communication circuitry configured to perform communication with the wireless power transmission apparatus, a plate including a display and a protective cover provided to protect the display, a weight sensor configured to measure a weight of an object while the object is placed on the plate, and a controller configured to control the display to display a cutting guide based on the measured weight.

The communication circuitry may be configured to receive a target weight of the object from the wireless power transmission apparatus.

The controller may be configured to determine a target cutting length of the object based on a difference between the measured weight and the target weight, and configured to control the display to display the cutting guide which corresponds to the target cutting length.

The electronic cutting board may further include a touch sensor arranged on an upper portion of the display, and the controller may be configured to determine the target cutting length of the object based on a difference between the measured weight, the target weight and an output of the touch sensor.

The display may be configured to display a plurality of scales spaced apart by a predetermined interval.

The controller may be configured to determine a position of a scale for displaying the cutting guide among the plurality of scales based on the output of the touch sensor.

The power receiver may include a receiving coil in which a voltage is induced by a magnetic field.

In accordance with another aspect of the disclosure, a wireless power transmission apparatus connected to a mobile device, includes a plate provided on an upper portion of the wireless power transmission apparatus, a transmitting coil configured to transmit power to a wireless electronic device while the wireless electronic device is placed on the plate or configured to heat a cooking vessel while the cooking vessel is placed on the plate, a communication circuitry configured to receive a recipe from the mobile device, a display configured to display a screen, an inputter configured to receive a user input; and a controller configured to control the communication circuitry and the display to allow the screen displayed on the display and a screen displayed on the mobile device to interwork with each other.

The display may be configured to sequentially display a screen indicating a plurality of cooking steps constituting the recipe.

The controller may be configured to control the communication circuitry to transmit a command, so that a current cooking step is moved to a next cooking step among the plurality of cooking steps, to the mobile device.

According to an embodiment, a command so that a current cooking step is moved to a next cooking step is transmitted to the mobile device in response to the received user input corresponding to the command or in response to a predetermined condition being satisfied.

In response to receiving the command, from the mobile device, the controller may be configured to control the display to display a the next cooking step.

In response to an operation, which is performed for a predetermined time, being contained in the current cooking step among the plurality of cooking steps, the controller may be configured to control the display to execute a timer function.

In response to an electronic cutting board being placed on the plate, the controller may be configured to control the communication circuitry to transmit a target weight of an object to the electronic cutting board based on the recipe.

In response to receiving the measured weight of the object from the electronic cutting board, the controller may be configured to control the display to display the measured weight.

The controller may be configured to control the display to display information about a wireless electronic device or a cooking vessel involving the current cooking step among the plurality of cooking steps.

In accordance with another aspect of the disclosure, a cooking management method using a wireless power transmission apparatus, includes connecting the wireless power transmission apparatus to a mobile device, receiving a recipe from the mobile device by the wireless power transmission apparatus, displaying a screen on a display of the wireless power transmission apparatus, and allowing the screen displayed on the display of the wireless power transmission apparatus to interwork with a screen displayed on the mobile device.

The displaying of the screen related to the recipe may include sequentially displaying a plurality of cooking steps constituting the recipe.

The screen displayed on the display of the wireless power transmission and the screen displayed on the mobile device interwork with each where command is transmitted to the mobile device so that a current cooking step is moved to a next cooking step among the plurality of cooking steps.

The screen displayed on the display of the wireless power transmission and the screen displayed on the mobile device interwork with each other where the command is transmitted to the mobile device in response to the received user input corresponding to the command or in response to a predetermined condition being satisfied.

The screen displayed on the display of the wireless power transmission and the screen displayed on the mobile device interwork with each other to display the next cooking step in response to receiving the command from the mobile device.

The cooking management method may further include, in response to an operation, which is performed for a predetermined time, being contained in the current cooking step among the plurality of cooking steps, executing a timer function by the wireless power transmission apparatus.

The cooking management method may further include, in response to an electronic cutting board being placed on a plate of the wireless power transmission apparatus, connecting the wireless power transmission apparatus to the electronic cutting board.

The cooking management method may further include, in response to receiving a weight of an object, which is measured by the electronic cutting board, by the wireless power transmission apparatus, displaying the measured weight on the display of the wireless power transmission apparatus.

The cooking management method may further include transmitting a target weight of the object to the electronic cutting board, by the wireless power transmission apparatus, and displaying a cutting guide based on the measured weight and the target weight of the material by the electronic cutting board.

Additional aspects of the disclosure will be set forth in part in the description which follows and, in part, will be obvious from the description, or may be learned by practice of the disclosure.

BRIEF DESCRIPTION OF THE DRAWINGS

These and/or other aspects of the disclosure will become apparent and more readily appreciated from the following description of embodiments, taken in conjunction with the accompanying drawings of which:

FIG. 29 is a view illustrating the case in which a plurality of small appliances is arranged in the wireless power transmission apparatus according to an embodiment of the disclosure;

FIG. 33 is a flowchart illustrating a cooking management method using the electronic cutting board in the cooking management method according to an embodiment.

DETAILED DESCRIPTION

Figure 1:
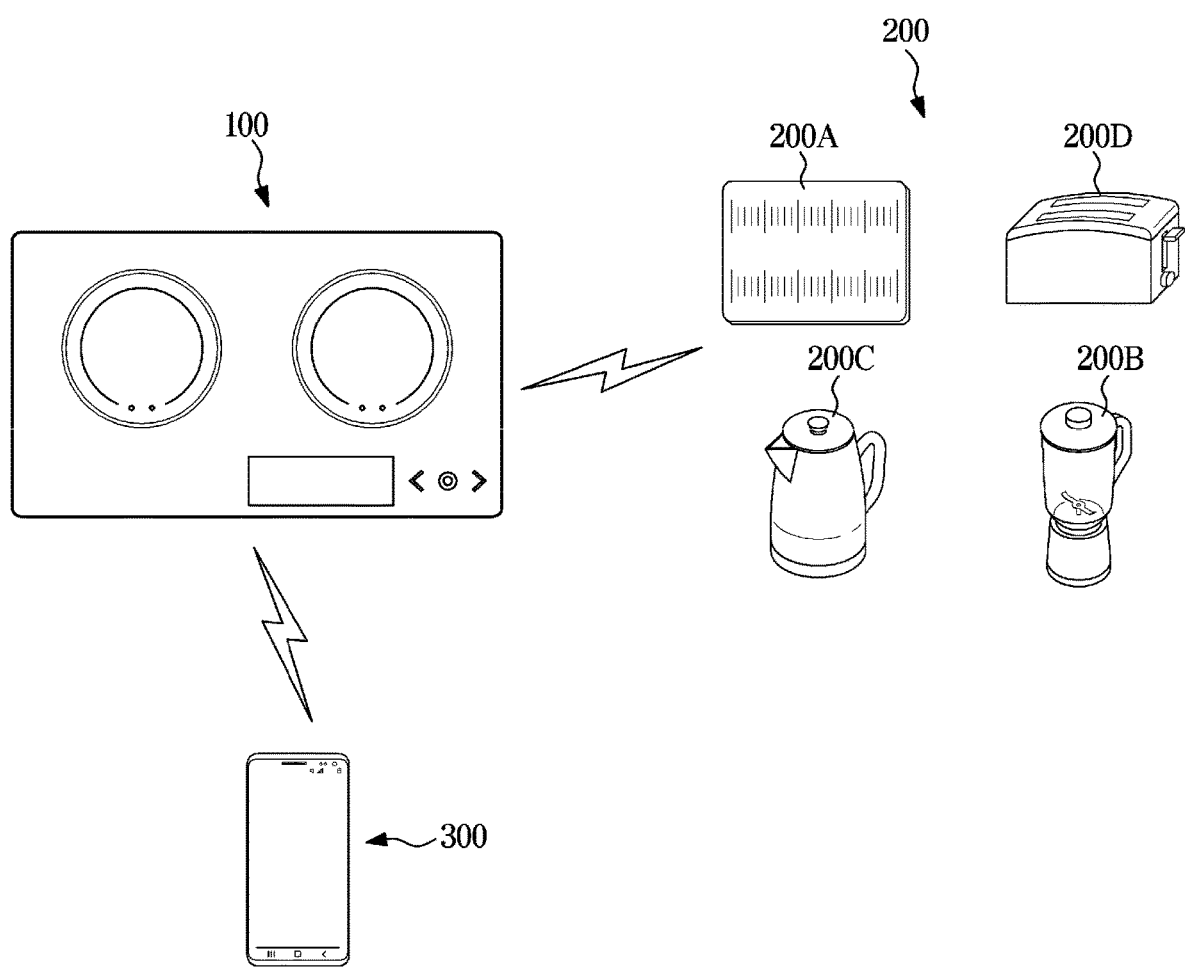
FIG. 1 is a view illustrating examples of devices connectable to a wireless transmission apparatus according to an embodiment of the disclosure.

In the following description, like reference numerals refer to like elements throughout the specification. Well-known functions or constructions are not described in detail since they would obscure the one or more exemplar embodiments with unnecessary detail. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

It will be understood that when an element is referred to as being "connected" another element, it can be directly or indirectly connected to the other element, wherein the indirect connection includes "connection via a wireless communication network" or "connection via an electrical wiring".

Also, when a part "includes" or "comprises" an element, unless there is a particular description contrary thereto, the part may further include other elements, not excluding the other elements.

Throughout the description, when a member is "on" another member, this includes not only when the member is in contact with the other member, but also when there is another member between the two members.

Throughout the description, when an element transfers or transmits a signal or data to another element, it does not exclude that another element exists between the element and the other element and the signal or data is transferred or transmitted through the another element, unless there is a particular description contrary thereto.

It will be understood that, although the terms first, second, third, etc., may be used herein to describe various elements, but is should not be limited by these terms. These terms are only used to distinguish one element from another element, and the used ordinal number may do not indicate the arrangement order, manufacturing order, or importance between the components.

As used herein, the singular forms "a," "an" and "the" are intended to include the plural forms as well, unless the context clearly indicates otherwise.

An identification code is used for the convenience of the description but is not intended to illustrate the order of each step. The each step may be implemented in the order different from the illustrated order unless the context clearly indicates otherwise.

Hereinafter an electronic cutting board, a wireless power transmission apparatus, and a cooking management method according to an aspect will be described in detail with reference to the accompanying drawings.

Therefore, it is an aspect of the disclosure to provide an electronic cutting board capable of performing various functions such as weighing and cutting guide by receiving power from a wireless power transmission apparatus.

It is another aspect of the disclosure to provide a wireless power transmission apparatus capable of receiving recipe information by being connected to a mobile device, capable of performing an operation corresponding to the received recipe information, and capable of allowing a screen thereof to interwork with the connected mobile device.

It is another aspect of the disclosure to provide a cooking management method capable of managing an entire cooking process by connecting a wireless power transmission apparatus to a mobile device and a wireless electronic device.

FIG. 1 is a view illustrating examples of devices connectable to a wireless transmission apparatus according to an embodiment of the disclosure.

Referring to FIG. 1, a wireless transmission apparatus 100 according to an embodiment may wirelessly supply power to various types of wireless electronic devices 200 and at the same time, perform control of the wireless electronic device 200 by being connected to the wireless electronic device 200 through a wireless communication method.

For example, the wireless electronic device 200 may be a small appliance used in the kitchen, such as an electronic cutting board 200A, a blender 200B, an electric pot 200C, and a toaster 200D. However, the type of the wireless electronic device 200 is not limited thereto, and in addition to the above examples, an electric device configured to wirelessly receive power, provided to be movable, and having a size to be arranged on the wireless power transmission apparatus 100 for receiving power, such as an electric rice cooker, and an air fryer may correspond to the wireless electronic device 200 according to the embodiment.

In order to use a conventional small appliance, it is required to repeat a process of plugging and unplugging a plug to supply power, and there is also the inconvenience of arranging the wires for power supply. However, according to the embodiment, power is supplied only by placing the wireless electronic device 200 on the wireless power transmission apparatus 100, thereby eliminating the aforementioned inconvenience, maximizing the convenience of use, and reducing design restrictions.

The wireless power transmission apparatus 100 may be connected to a mobile device 300 by a wireless communication method so as to exchange necessary information. For example, the wireless power transmission apparatus 100 may receive a recipe from the mobile device 300, and may overall manage a cooking process according to the received recipe.

The mobile device 300 may include a portable electronic device provided with a user interface, such as a smart phone or a tablet PC.

As mentioned above, in response to being wirelessly connected to the mobile device 300 and the wireless electronic device 200, the wireless power transmission apparatus 100 may supply power to the wireless electronic device 200 while performing the control thereof, so as to manage a cooking process according to the recipe received from the mobile device 300.

Hereinafter a configuration of the wireless power transmission apparatus 100 and various devices connected to the wireless power transmission apparatus 100 will be described in detail.

Figure 2:
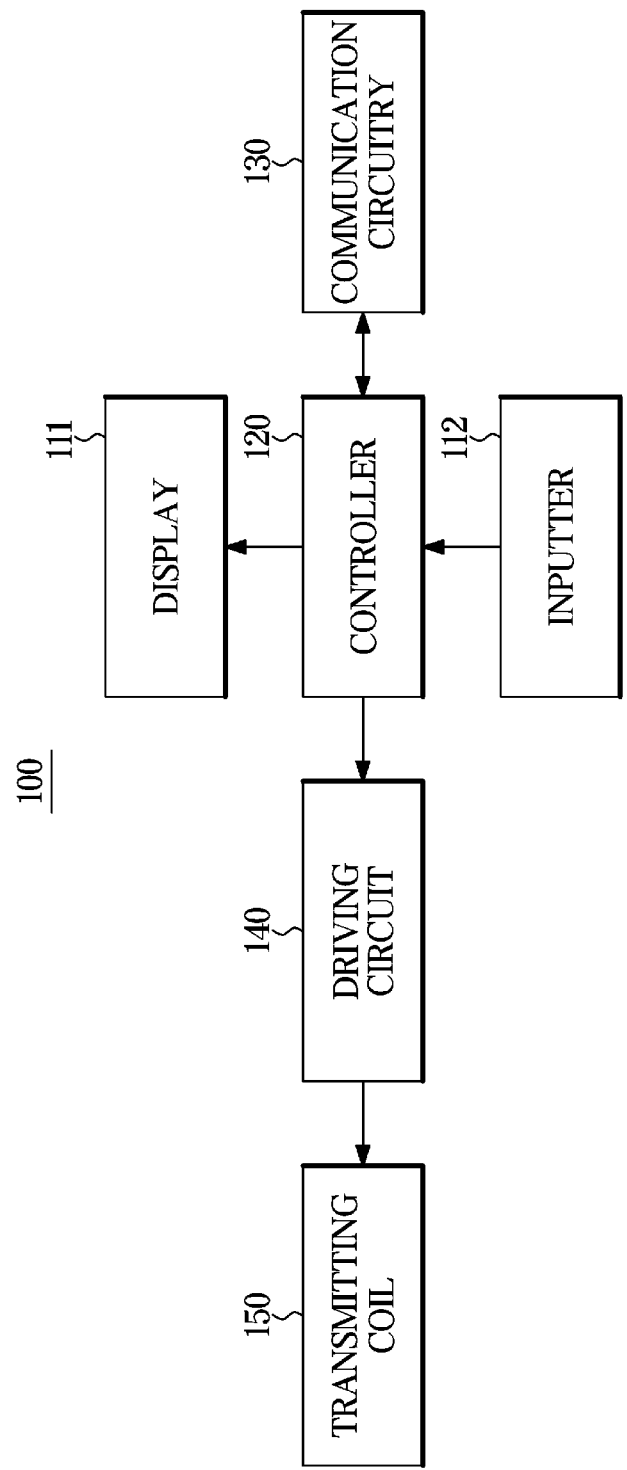
FIG. 2 is a control block diagram of the wireless power transmission apparatus according to an embodiment of the disclosure.
Figure 3:
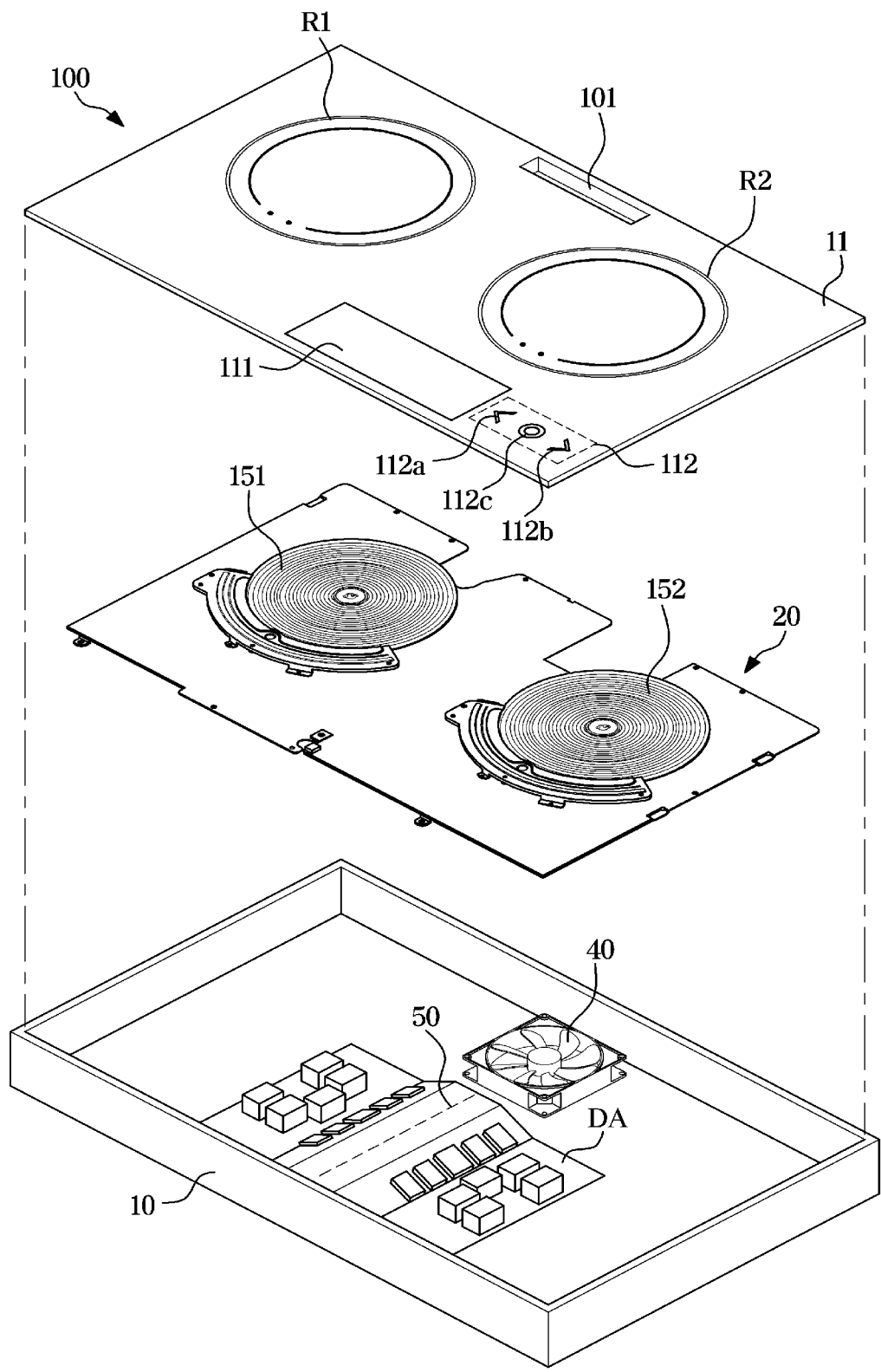
FIG. 3 is an exploded perspective view illustrating a configuration of the wireless power transmission apparatus according to an embodiment of the disclosure.
Figure 4:
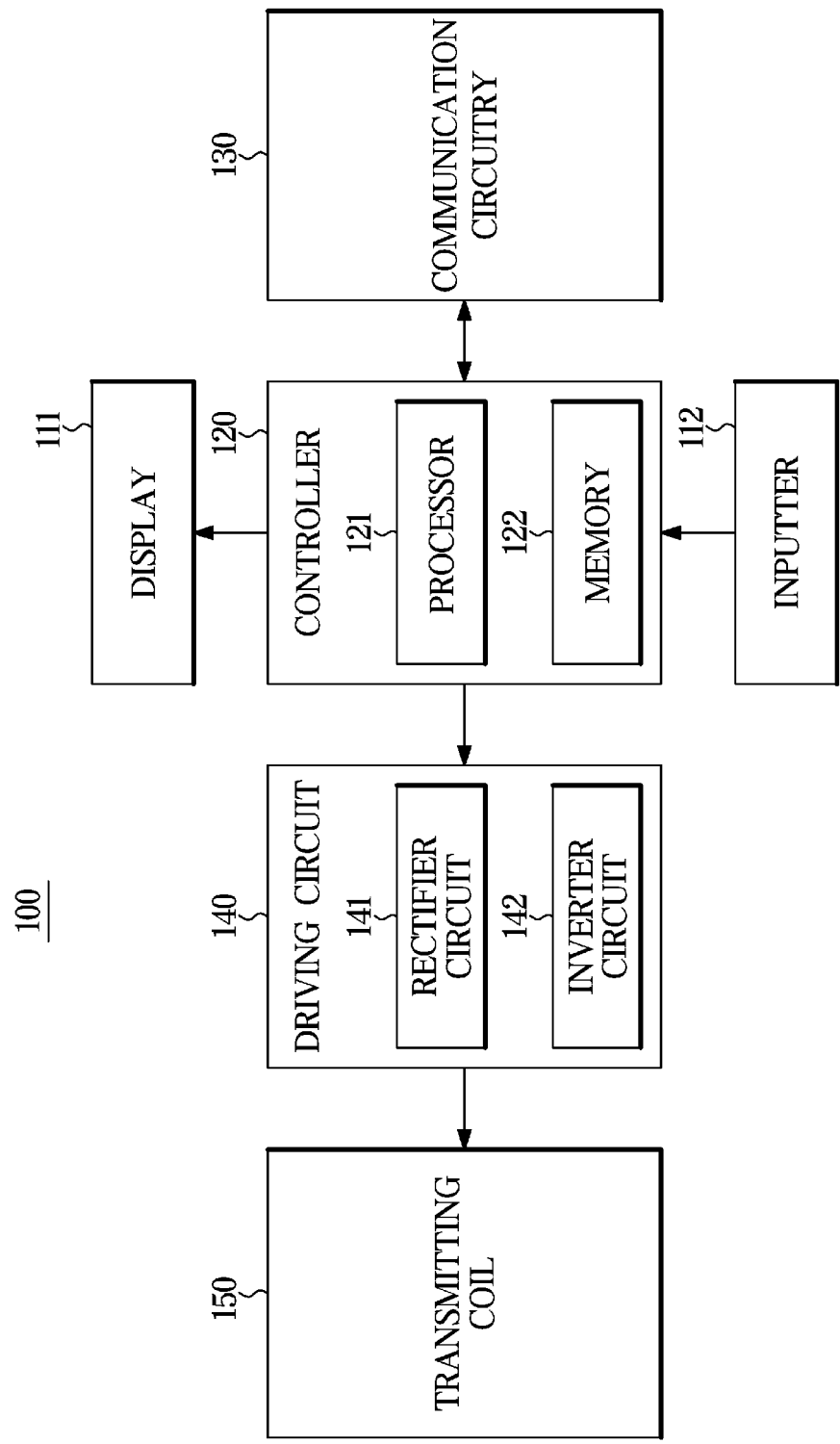
FIG. 4 is a more detailed-control block diagram of the wireless power transmission apparatus according to an embodiment of the disclosure.

FIG. 2 is a control block diagram of the wireless power transmission apparatus according to an embodiment of the disclosure, FIG. 3 is an exploded perspective view illustrating a configuration of the wireless power transmission apparatus according to an embodiment of the disclosure, and FIG. 4 is a more detailed-control block diagram of the wireless power transmission apparatus according to an embodiment of the disclosure.

Referring to FIGS. 2 and 3, the wireless power transmission apparatus 100 according to an embodiment includes a plate 11 provided on an upper portion thereof, a transmitting coil 150 configured to transmit power to the wireless electronic device 200 arranged on the plate 11 and configured to heat a cooking vessel arranged on the plate 11, a communication circuitry 130 configured to receive a recipe from the mobile device 300, a display 111 configured to display a screen related to the received recipe, an inputter 112 configured to receive a user input, and a controller 120 configured to control overall operations of the wireless power transmission apparatus 100.

Driving regions R1 and R2 for supplying wireless power may be provided on an upper surface of the plate 11, and the wireless electronic device 200 may be arranged in the driving region R to receive wireless power.

The driving region R may be provided at a position corresponding to the transmitting coil 150, and an indicator indicating a position of the driving region R to guide an arrangement of the wireless electronic device 200 or the cooking vessel may be provided on the plate 11.

FIG. 3 illustrates a case, in which two driving regions R1 and R2 are provided, as an example, but a single driving region R may be provided, and three or more driving regions may be provided. The number of transmitting coils 150 may vary according to the number of driving regions.

The wireless power transmission apparatus 100 may wirelessly transmit power to the wireless electronic device 200 using a known magnetic induction or magnetic resonance method of the wireless power transmission technology. The magnetic induction method is a method of inducing a voltage in a receiving coil 251 (refer to FIG. 6) by changing a magnetic field of the transmitting coil 150. The magnetic resonance method is a method of generating a resonance phenomenon using the same resonant frequency in the transmitting coil 150 and the receiving coil 251, and transmitting power by the resonance phenomenon.

In addition, in response to the cooking vessel being located in the driving region R of the wireless power transmission apparatus 100, the cooking vessel may be heated by a magnetic or electromagnetic field generated by the transmitting coil 150.

When two driving regions are provided on the plate 11, one region may be used for the wireless power transmission and the other region may be used for heating the cooking vessel. Alternatively, both regions may be used for the wireless power transmission and heating of the cooking vessel.

An exterior of the wireless power transmission apparatus 100 may be formed by a housing 10 and the plate 11, and the housing 10 and the plate 11 may be implemented with various materials. For example, the plate 11 may be formed of tempered glass such as ceramic glass.

The display 111 and the inputter 112 may be provided in a region spaced apart from the driving region R on the plate 11. The display 111 may display information about an operation of the wireless electronic device 200 arranged on the driving regions R1 and R2 as well as information about the recipe. In addition, in a state in which the wireless power transmission apparatus 100 performs the function of induction, the display 111 may display information about operating conditions (intensity, time, etc.) of the induction.

A case in which the display 111 and the inputter 112 are provided on the upper surface of the plate 11 is illustrated as an example, but the embodiment of the wireless power transmission apparatus 100 is not limited thereto. Therefore, the display 111 and the inputter 112 may be provided on a position other than the upper surface of the plate 11 as long as a user can conveniently check the display 111 and manipulate the inputter 112.

Further, a cradle 101 on which the mobile device 300 is mounted may be provided on the plate 11. The cradle 101 may be provided integrally with the plate 11, or may be provided to be coupled to/removed from the plate 11.

In response to the mobile device 300 being mounted on the cradle 101, the communication circuitry 130 may be connected to the mobile device 300 by a wireless communication method to exchange necessary information. In addition, the wireless power transmission apparatus 100 may wirelessly supply power to the mobile device 300.

In an embodiment to be described later, that the mobile device 300 is connected to the wireless power transmission apparatus 100 may mean that the mobile device 300 and the wireless power transmission apparatus 100 may exchange information through wireless communication.

The communication circuitry 130 may communicate with the mobile device 300 or the wireless electronic device 200 by using at least one wireless communication method of Radio Frequency Identification (RFID), infrared communication, Wi-Fi, Bluetooth, Zigbee, Near Field Communication (NFC), 4G, or 5G.

For example, a recipe may be received from the mobile device 300 using Bluetooth or Wi-Fi. In addition, information about the wireless electronic device 200 arranged in the driving region R may be read using an NFC reader or an RFID reader, and information may be exchanged with the wireless electronic device 200 using Bluetooth or Wi-Fi.

As described above, in response to the wireless power transmission apparatus 100 being connected to the mobile device 300, the communication circuitry 130 may receive the recipe from the mobile device 300, and the display 111 may display information about the received recipe. These operations may be controlled by the controller 120, and in an embodiment to be described later, it can be understood that operations performed by the components of the wireless power transmission apparatus 100 are controlled by the controller 120, even if there is no separate mention.

Figure 7:
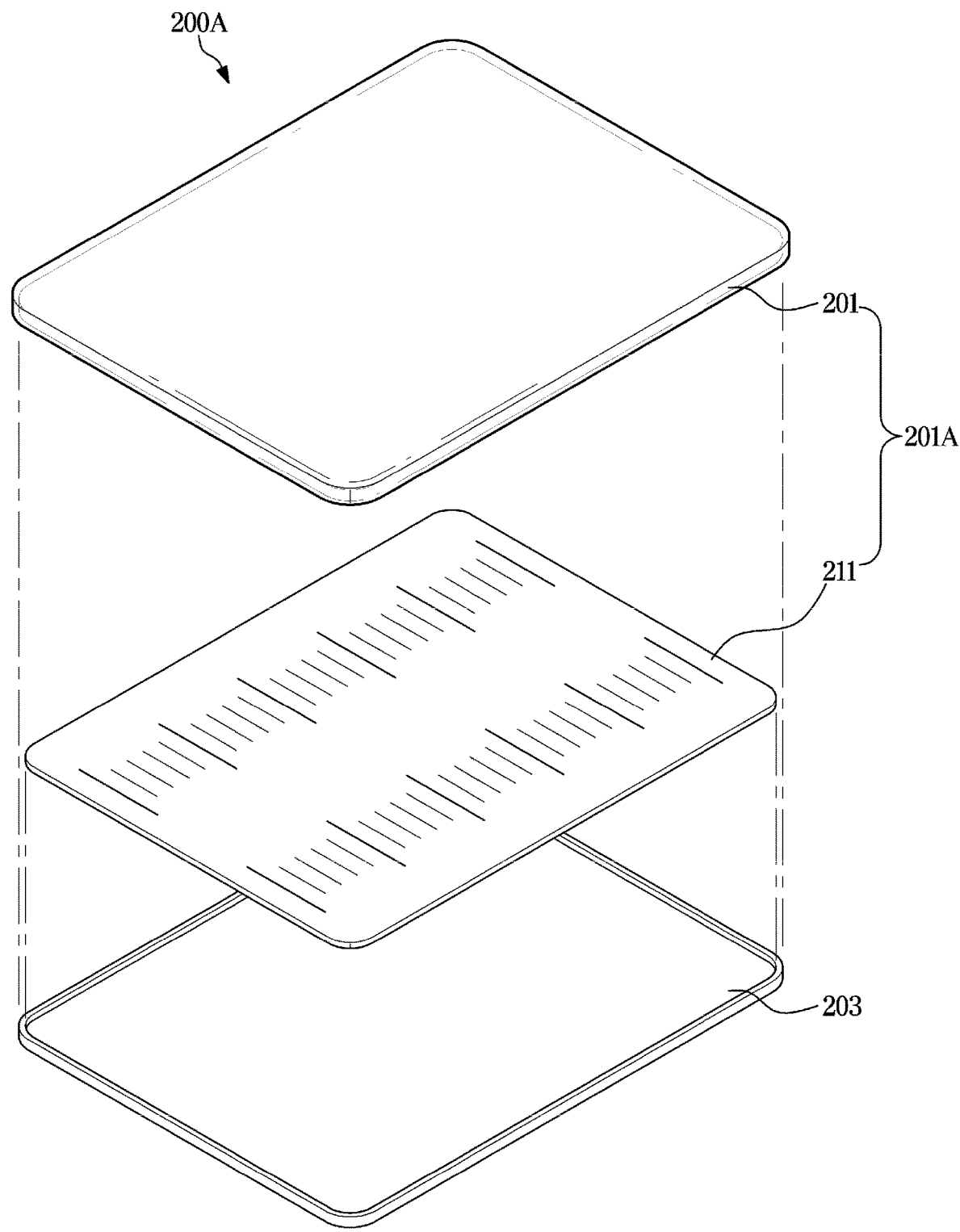
FIG. 7 is an exploded perspective view schematically illustrating a configuration of the electronic cutting board according to an embodiment of the disclosure.

Further, in response to the mobile device 300 being connected to the wireless power transmission apparatus 100, the screen displayed on the display 111 of the wireless power transmission apparatus 100 may interwork with a screen displayed on a display 311 of the mobile device 300 (refer to FIG. 7).

For example, in response to the screen, which is displayed on the display 311 of the mobile device 300, being switched to a next screen indicating a next cooking step among a plurality of cooking steps constituting the recipe, the screen displayed on the display 111 of the wireless power transmission apparatus 100 may be switched to a next screen.

Conversely, in response to the screen, which is displayed on the display 111 of the wireless power transmission apparatus 100, being switched to the next screen indicating the next cooking step of the recipe, the screen displayed on the display 311 of the mobile device 300 may be switched to the next screen.

The inputter 112 may be implemented in the form of at least one of various types of input devices, such as a switch, a touch pad, and a jog shuttle. In this example, the inputter 112 is implemented as a touchpad, and the inputter 112 may include a first button 112a for decreasing a number or moving to a previous step, a second button 112b for increasing a number or moving to a next step, and a third button 112c for the selection. When the wireless power transmission apparatus 100 heats the cooking vessel, the number may indicate a degree of heating, that is, an intensity of induction, and when the wireless power transmission apparatus 100 is connected to the wireless electronic device 200, the number may be related to an operation of the wireless electronic device 200.

That is, the inputter 112 may receive not only a user input regarding the operation of the wireless power transmission apparatus 100, but also a user input regarding the operation of the wireless electronic device 200 connected to the wireless power transmission apparatus 100. Accordingly, even if a user interface such as a display or an inputter is not provided in the wireless electronic device 200, it is possible to control the wireless electronic device 200 by sharing the user interface of the wireless power transmission apparatus 100. Accordingly, it is possible to integrally perform the control of various small appliances and to overcome the design limitations of the small appliances.

A coil layer 20 may be provided under the plate 11, and the coil layer 20 may be accommodated in the housing 10. The coil layer 20 may include at least one transmitting coil 150. In this example, two transmitting coils 151 and 152 may be provided, and correspondingly, two driving regions R1 and R2 may also be provided.

The transmitting coil 150 may generate a magnetic field or electromagnetic field based on a current applied from a driving circuit 140, and wireless power may be supplied to the wireless electronic device 200 by the generated magnetic field or electromagnetic field. When the plurality of transmitting coils 151 and 152 is provided, each of the transmitting coils 151 and 152 may be driven independently of each other.

In addition to the coil layer 20, a fan 40, a heat sink 50, and a driving assembly DA may be accommodated in the housing 10. The heat sink 50 may absorb heat generated from the driving assembly DA and radiate the absorbed heat to the surroundings, and the fan 40 may circulate heat inside the housing 10 to emit the heat to the outside of the wireless power transmission apparatus 100. The rotation of the fan 40 may be controlled by the controller 120.

The driving assembly DA may include at least one printed circuit board, and components such as the driving circuit 140 and the controller 120 may be provided on the printed circuit board.

The driving circuit 140 may receive power from an external power source, rectify the power, and provide the rectified power to the transmitting coil 150 and the controller 120. Further, the controller 120 may distribute the power transmitted from the driving circuit 140 to other components such as the communication circuitry 130, the display 111, and the inputter 112.

Alternatively, the driving circuit 140 may directly supply the rectified power to components such as the transmitting coil 150, the controller 120, the communication circuitry 130, the display 111, and the inputter 112.

Referring to FIG. 4, the driving circuit 140 may include a rectifier circuit 141 and an inverter circuit 142. The rectifier circuit 141 may convert AC power into DC power. The rectifier circuit 141 may convert an AC voltage, in which a magnitude and polarity (positive voltage or negative voltage) change with time, into a DC voltage with a constant magnitude and polarity, and convert an AC, in which a magnitude and direction (positive current or negative current) change with time, into a DC with a constant magnitude.

The rectifier circuit 141 may include a bridge diode. The rectifier circuit 141 may include four diodes. Two diodes may form a pair of diodes connected in series, and the two pairs of diodes may be connected in parallel with each other. The bridge diode may convert an AC voltage, in which a polarity thereof changes with time, into a positive voltage with a constant polarity, and convert an AC, in which a direction thereof changes with time, into a positive current with a constant direction.

Further, the rectifier circuit 141 may include a DC link capacitor. The DC link capacitor may convert a positive voltage in which a magnitude thereof changes with time, into a DC voltage with a constant magnitude. The DC link capacitor may maintain the DC voltage and provide the DC voltage to the inverter circuit.

The inverter circuit 142 may allow a current to flow in the transmitting coil 150 by switching the voltage applied to the transmitting coil 150. The inverter circuit 142 may include a switching circuit configured to supply or block a current to the transmitting coil 150, and a resonance capacitor. The switching circuit may include two switch elements. One end of the transmitting coil 150 is connected to a connection point of the switch element, and the other end of the transmitting coil 150 is connected to the resonance capacitor. The switch element may be turned on or off according to a control signal of the controller 120. A current and voltage may be applied to the transmitting coil 150 depending on the switching operation (on/off) of the switch element.

Two resonance capacitors may be provided and serve as a buffer. The resonance capacitor affects the energy loss by controlling a saturation voltage rise rate during the switch element is off. Further, the resonance capacitor determines a resonance frequency of the transmitting coil 150.

Because the switch element is turned on or off at high speed, the switch element may be implemented as a three-terminal semiconductor element switch having a fast response speed. For example, the switch element may be a bipolar junction transistor (BJT), a metal-oxide-semiconductor field effect transistor (MOSFET), an insulated gate bipolar transistor (IGBT), or a thyristor.

The transmitting coil 150 forms a magnetic field by a current applied from the inverter circuit. By the magnetic field, a voltage may be induced in the receiving coil 251 of the wireless electronic device 200 arranged in the driving region R of the plate 11.

The controller 120 may include at least one processor 121 and at least one memory 122. The memory 122 may store programs, instructions, and data for controlling the operation of the wireless power transmission apparatus 100. The processor 121 may control the operation of the wireless power transmission apparatus 100 by executing a program stored in the memory 122.

The processor 121 corresponding to hardware may include a logic circuit and an arithmetic circuit. The processor 121 may process data according to a program and an instruction provided from the memory 122, and generate a control signal according to the processing result.

The memory 122 may include a volatile memory such as a static random access memory (SRAM) or a dynamic random access memory (DRAM) for temporarily storing data, and a nonvolatile memory such as a Read Only Memory, an Erasable Programmable Read Only Memory (EPROM) or an Electrically Erasable Programmable Read Only Memory (EEPROM) for storing data for a long period of time.

Figure 5:
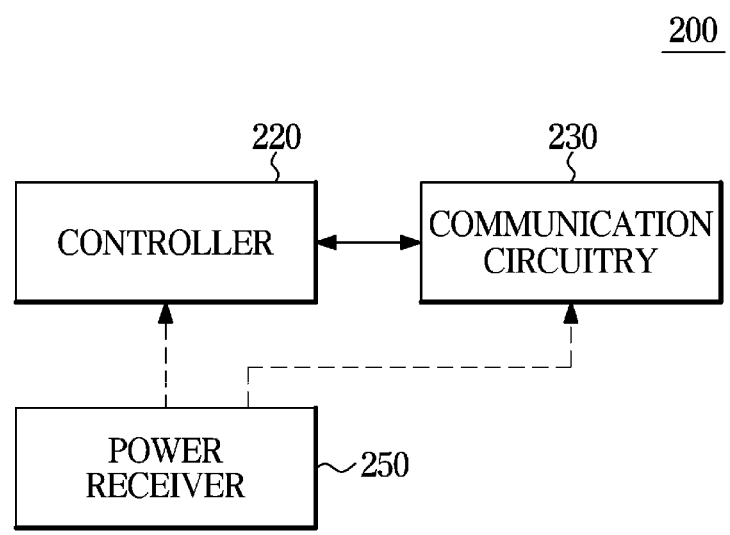
FIG. 5 is a control block diagram of a wireless electronic device according to an embodiment of the disclosure.

FIG. 5 is a control block diagram of a wireless electronic device according to an embodiment of the disclosure.

Referring to FIG. 5, the wireless electronic device 200 according to an embodiment includes a power receiver 250 configured to receive power from the wireless power transmission apparatus 100, a communication circuitry 230 configured to communicate with the wireless power transmission apparatus 100, and a controller 220 configured to control the operation of the wireless electronic device 200.

The communication circuitry 230 may communicate with the wireless power transmission apparatus 100 by using at least one wireless communication method of Radio Frequency Identification (RFID), infrared communication, Wi-Fi, Bluetooth, Zigbee, Near Field Communication (NFC), 4G, or 5G.

For example, information about the wireless electronic device 200, for example, identification information for recognizing the type of the wireless electronic device 200, may be recorded on the NFC tag or the RFID tag. In response to the wireless electronic device 200 being arranged in the driving region R of the wireless power transmission apparatus 100, an NFC reader or RFID reader of the wireless power transmission apparatus 100 may read the identification information recorded in the NFC tag or the RFID tag so as to recognize the type of the wireless electronic device 200. For this, the NFC tag or the RFID tag may be provided at a position corresponding to the NFC reader or the RFID reader of the wireless power transmission apparatus 100.

After the type of the wireless electronic device 200 is identified, the wireless electronic device 200 may be connected to the wireless power transmission apparatus 100 using Bluetooth or Wi-Fi. After being connected to the wireless power transmission apparatus 100, the wireless electronic device 200 may receive an operation command from the wireless power transmission apparatus 100 or transmit information about the operation or state of the wireless electronic device 200 to the wireless power transmission apparatus 100.

In an embodiment to be described later, that the wireless electronic device 200 is connected to the wireless power transmission apparatus 100 may mean that the wireless electronic device 200 is in a state of exchanging information with the wireless power transmission apparatus 100 through wireless communication.

After the wireless electronic device 200 is connected to the wireless power transmission apparatus 100, it is possible to control the wireless electronic device 200 through the wireless power transmission apparatus 100. That is, a user input for controlling the operation of the wireless electronic device 200 may be received using the user interfaces 111 and 112 provided in the wireless power transmission apparatus 100, and the wireless power transmission apparatus 100 may generate a signal for controlling the operation of the wireless electronic device 200 and transmit the signal to the wireless electronic device 200 according to the received user input. Accordingly, according to an embodiment, a user interface such as a display or an inputter may be omitted in the wireless electronic device 200.

In addition, although omitted from the control block diagram, components for performing a unique function may be additionally provided according to the type of the wireless electronic device 200. For example, when the wireless electronic device 200 is the blender 200B, the wireless electronic device 200 may further include components such as a blade and a motor for grinding materials (objects), and when the wireless electronic device 200 is the toaster 200D or the electric port 200C, the wireless electronic device 200 may further include a component such as a heating device for heating a material.

Hereinafter a case in which the wireless electronic device 200 is the electronic cutting board 200A will be described as an example for detailed description.

Figure 6:
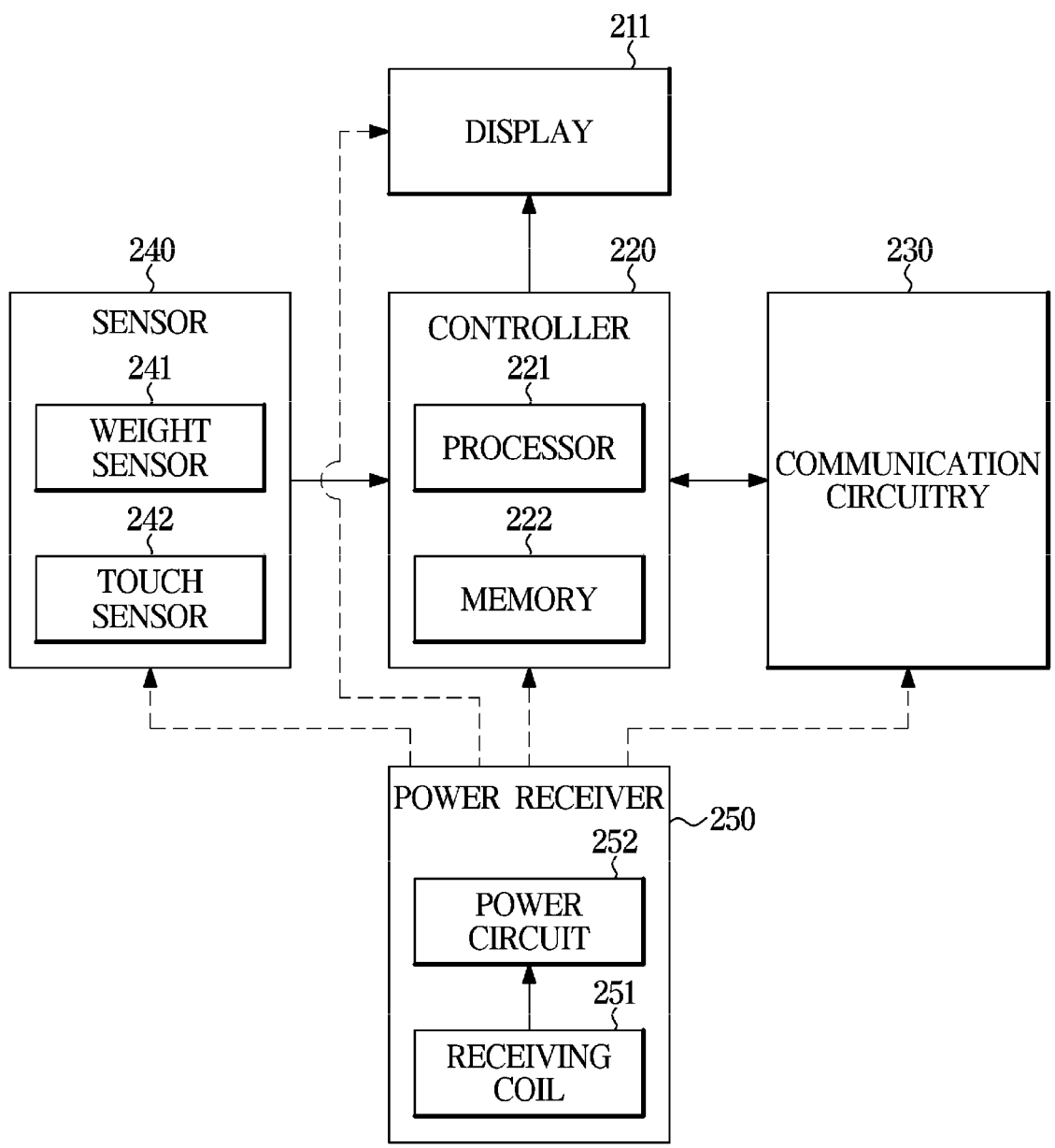
FIG. 6 is a control block diagram of a case in which the wireless electronic device according to an embodiment of the disclosure is an electronic cutting board.
Figure 8:
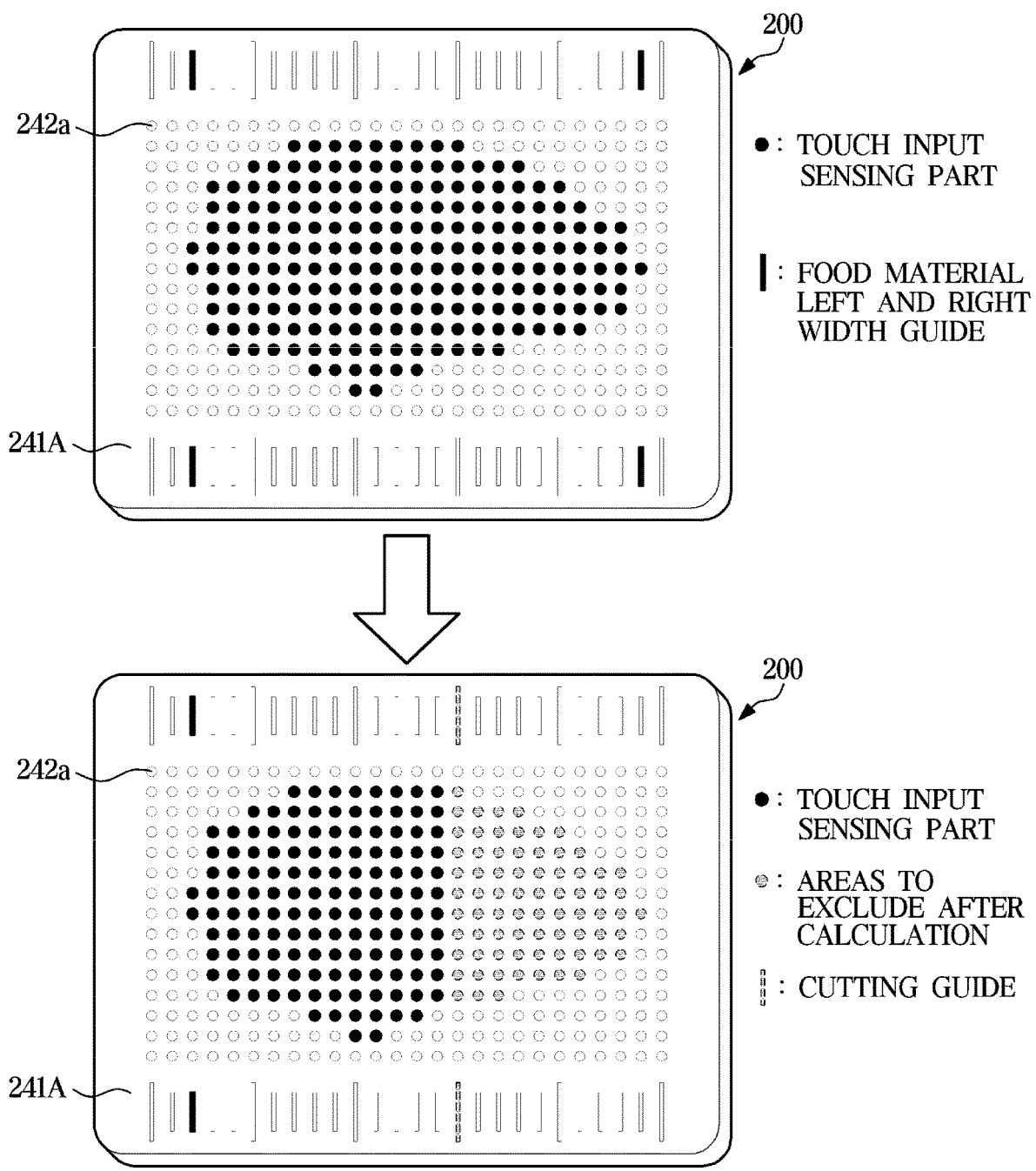
FIG. 8 is a view illustrating an operation performed by the electronic cutting board to display a cutting guide according to an embodiment of the disclosure.

FIG. 6 is a control block diagram of a case in which the wireless electronic device according to an embodiment of the disclosure is an electronic cutting board, FIG. 7 is an exploded perspective view schematically illustrating a configuration of the electronic cutting board, and FIG. 8 is a view illustrating an operation performed by the electronic cutting board to display a cutting guide.

Referring to FIG. 6, the electronic cutting board 200A may further include a display 211 and a sensor 240 in addition to the communication circuitry 230, the controller 220, and the power receiver 250 described above. Each component will be described in detail.

The controller 220 may include at least one processor 221 and at least one memory 222. The memory 222 may store programs, instructions, and data for controlling the operation of the wireless electronic device 200. The processor 221 may control the operation of the wireless electronic device 200 by executing a program stored in the memory 222.

The processor 221 corresponding to hardware may include a logic circuit and an arithmetic circuit. The processor 221 may process data according to a program and an instruction provided from the memory 222, and generate a control signal according to the processing result.

The memory 222 may include a volatile memory such as a static random access memory (SRAM) or a dynamic random access memory (DRAM) for temporarily storing data, and a nonvolatile memory such as a Read Only Memory, an Erasable Programmable Read Only Memory (EPROM) or an Electrically Erasable Programmable Read Only Memory (EEPROM) for storing data for a long period of time.

The power receiver 250 may include a receiving coil 251 in which a voltage is induced by a magnetic field and a power circuit 252 configured to convert the received power into a form usable by the wireless electronic device 200.

The power circuit 252 may include a rectifier circuit. AC voltage and AC may be applied to the receiving coil 251 configured to receive power from the transmitting coil 150. Because components of the wireless electronic device 200 require DC power, the power circuit 252 converts AC power into DC power.

In addition, the power circuit 252 may include a DC-DC converter configured to apply power of an appropriate size to each component of the wireless electronic device 200. For example, the power circuit 252 may be implemented as a switched-mode power supply (SMPS), which is a power supply that converts and supplies AC power or DC power through a switching operation.

Referring to FIG. 7 together, the electronic cutting board 200A may include the display 211 configured to display a cutting guide and a protective cover 201 arranged in an upper side of the display 211 to protect the display 211. The display 211 and the protective cover 201 may form a plate 201A, and a material to be cut may be arranged on the plate 201A.

A cutting guide for a user to cut a material may be provided in a variety of ways. For example, as illustrated in FIG. 7, a scale may be displayed on the display 211 as a cutting guide.

The protective cover 201 arranged above the display 211 may be formed of various materials capable of protecting the display 211 from cutting, such as silicon or plastic. In addition, the protective cover 201 may be implemented to be transparent to allow the display 211 arranged thereunder to be visually recognized.

Meanwhile, an entire region of the display 211 may be used to display information, and only a partial region thereof may be used to display information. As an example of the latter, a plurality of liquid emitting diodes (LEDs) in which on/off, brightness, or color thereof is controlled independently of each other, may be arranged in only a partial region in an upper side and lower side of the display 211 to display the scale.

The plate 201A may be supported or received by a housing 203, and the other components of the electronic cutting board 200A may also be accommodated in the housing 203.

Further, the electronic cutting board 200A may also perform a function as a kitchen scale to measure a weight of the material. For this, the sensor 240 of the electronic cutting board 200A may include a weight sensor 241. In response to the material being arranged on the plate 201A of the electronic cutting board 200A, the weight sensor 241 may measure a weight of the arranged material, and the measured weight may be transmitted to the wireless power transmission apparatus 100 through the communication circuitry 230.

As will be described later, when cooking according to a specific recipe is performed, materials having a predetermined weight are required. The electronic cutting board 200A may receive information about a predetermined weight from the wireless power transmission apparatus 100 through the communication circuitry 230, and the electronic cutting board 200A may display an appropriate cutting guide on the display 211 to allow the predetermined weight of the material (hereinafter referred to as a target weight) to be prepared.

The controller 220 may use an area of the material together with the difference between the target weight and the measured weight to display the cutting guide on the display 211.

In order to obtain the area of the material, the sensor 240 may further include a touch sensor 242 provided on the plate 201A. The controller 220 may determine a target cutting length based on the difference or ratio between the target weight and the measured weight and based on the output of the touch sensor 242, and control the display 211 to display a cutting guide according to the target cutting length.

For example, when information about a thickness of a material required for cooking is included in a recipe, it may be assumed that the thickness included in the recipe is a thickness of the material arranged on the plate 201A. The difference between the target weight and the measured weight may indicate a weight of the material to be cut (hereinafter, referred to as a cutting weight), and the controller 220 may determine to cut which position of the material so as to remove the cutting weight based to the thickness of the material and the output of the touch sensor 242.

Alternatively, as illustrated in FIG. 8, it is also possible to use a ratio of a contact area detected by the touch sensor 242. Particularly, the touch sensor 242 may include a plurality of touch sensor elements 242a two-dimensionally arranged at regular intervals.

As illustrated in an upper part of FIG. 8, at least some of the plurality of touch sensor elements 242a may detect a touch input by the material arranged on the plate 201A. When it is assumed that a ratio between the weight measured by the weight sensor 241 and the target weight is x:y and the number of touch sensor elements 242a configured to detect a touch input is a, the controller 220 may provide a cutting guide to remove a material in contact with $(1-y/x)*a$ touch sensor elements 242a, as illustrated in a lower part of FIG. 8.

As an example of a method of providing a cutting guide, only a scale corresponding to a cutting position may be turned on, as illustrated in FIG. 8, displayed in a different color, or displayed in a different brightness.

Meanwhile, in the above example, the target cutting length is determined by the controller 220 of the electronic cutting board 200, but it is also possible to determine the target cutting length by the controller 120 of the wireless power transmission apparatus 100.

Figure 9:
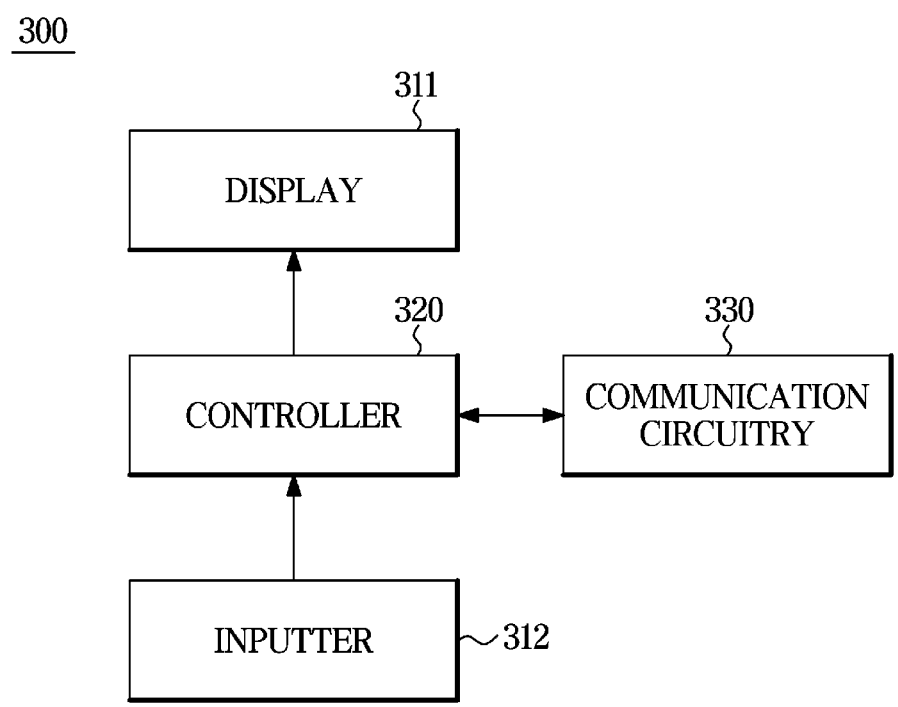
FIG. 9 is a control block diagram of a mobile device connected to the wireless power transmission apparatus according to an embodiment of the disclosure.
Figure 10:
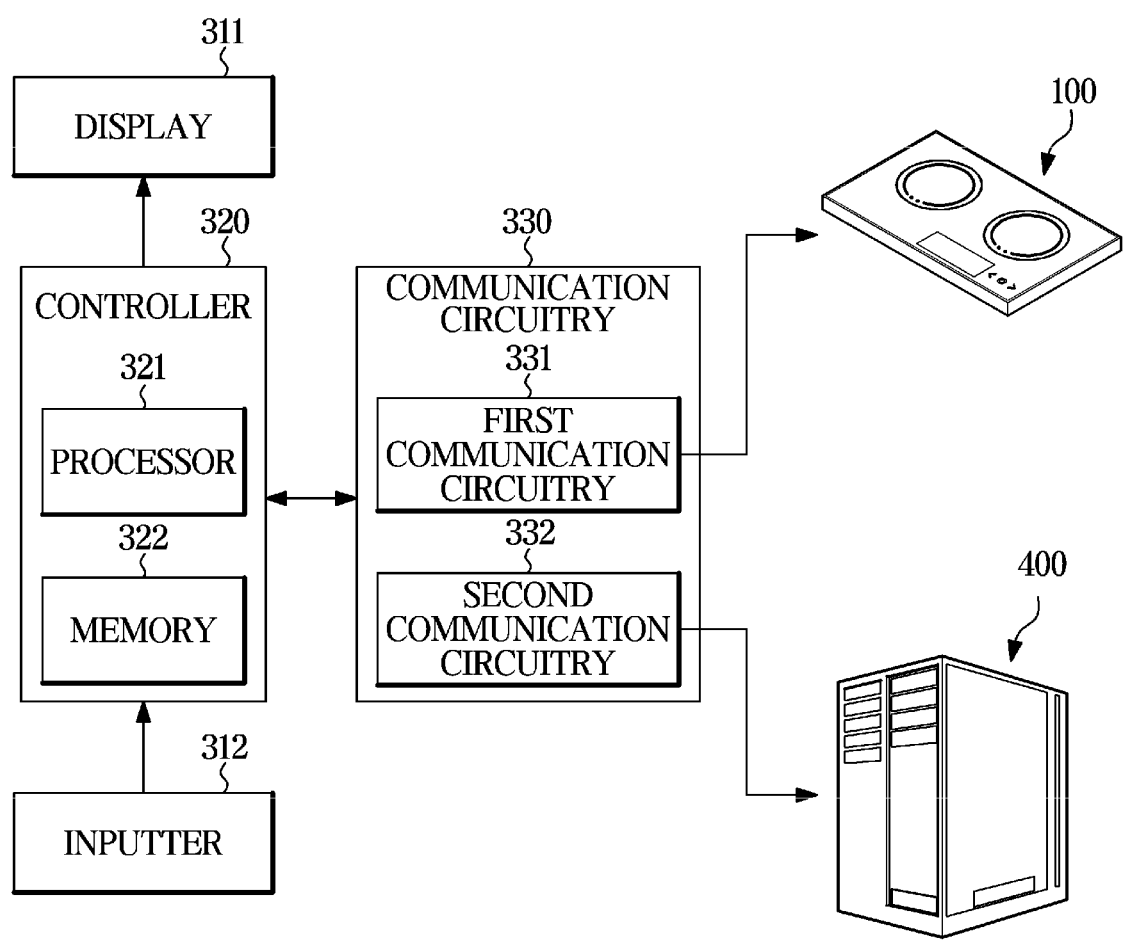
FIG. 10 is a control block diagram of the mobile device connected to the wireless power transmission apparatus according to an embodiment of the disclosure.

FIGS. 9 and 10 are control block diagrams of a mobile device connected to the wireless power transmission apparatus according to an embodiment of the disclosure.

Referring to FIG. 9, the mobile device 300 may include a display 311, an inputter 312, a controller 320, and a communication circuitry 330.

For example, the display 311 may display a screen for guiding a user's selection of a recipe, and the inputter 312 may receive a user input for selecting a recipe.

The controller 320 may control the communication circuitry 330 to transmit information about the selected recipe to the wireless power transmission apparatus 100. The controller 320 may transmit information about all of the plurality of cooking steps constituting the recipe at once, and may also transmit information about a current cooking step being displayed on the display 311.

The display 311 may sequentially display information about the plurality of cooking steps. In response to a predetermined condition being satisfied, the screen may be switched from a screen displaying information about a current cooking step to a screen displaying information about a next cooking step. The predetermined condition may include reception of a user input for moving to the next cooking step or lapse of a predetermined time. In the embodiment, the screen displayed on the display is a generic term for text, image, color, etc. displayed on the display.

In response to the above-described predetermined condition being satisfied, the controller 320 may transmit a command for moving to the next cooking step or information about the next cooking step to the wireless power transmission apparatus 100 through the communication circuitry 330. The wireless power transmission apparatus 100 receiving the command or the information may display a screen indicating information about the next cooking step on the display 111.

Conversely, the communication circuitry 330 may receive information about an operation of the wireless power transmission apparatus 100, information about an operation of the wireless home appliance 200 being controlled by the wireless power transmission apparatus 100, information about the current cooking step or a command regarding movement of the cooking step from the wireless power transmission apparatus 100.

For example, in response to receiving the command regarding the movement of the cooking step from the wireless power transmission apparatus 100, the controller 320 may control the screen displayed on the display 311 to be switched according to the received command. In this way, the screen displayed on the display 311 of the mobile device 300 and the screen displayed on the display 111 of the wireless power transmission apparatus 100 may interwork with each other.

Meanwhile, as illustrated in FIG. 10, the mobile device 300 may communicate not only with the wireless power transmission apparatus 100 but also with the server 400 configured to integrally manage home appliances in the house.

For this, the communication circuitry 330 of the mobile device 300 may include a first communication circuitry 331 configured to communicate with the wireless power transmission apparatus 100 and a second communication circuitry 332 configured to communicate with the server 400. For example, the first communication circuitry 331 may include a Bluetooth module, and the second communication circuitry 332 may include a Wi-Fi module or a 4G or 5G module.

However, an embodiment of the mobile device 300 or the wireless power transmission apparatus 100 is not limited thereto, and the wireless power transmission apparatus 100 and the server 400 may be connected to the mobile device 300 through the Wi-Fi module or the 4G or 5G module.

Alternatively, the wireless power transmission apparatus 100 may be connected the mobile device 300 through the server 400 instead of being directly connected to the mobile device 300.

The server 400 may integrally manage food storage devices, such as refrigerators and freezers and various cooking apparatuses such as ovens used in the house. In addition, the wireless power transmission apparatus 100 may also be a target of management of the server 400, and other home appliances that are not related to cooking, such as washing machines, TVs, air conditioners, air purifiers, cleaners, dryers, etc. may be a target of management.

The mobile device 300 may serve as a user interface or gateway for management of home appliances. For this, a program for managing home appliances may be installed in the mobile device 300, and the program may include a program for performing the above-described operation of the controller 320.

The installed program may be stored in at least one memory 322, and the stored program may be executed by at least one processor 321. Further, some of the operations of the mobile device 300 described above and some of the operations of the mobile device 300 described later may be executed by the server 400.

Figure 11:
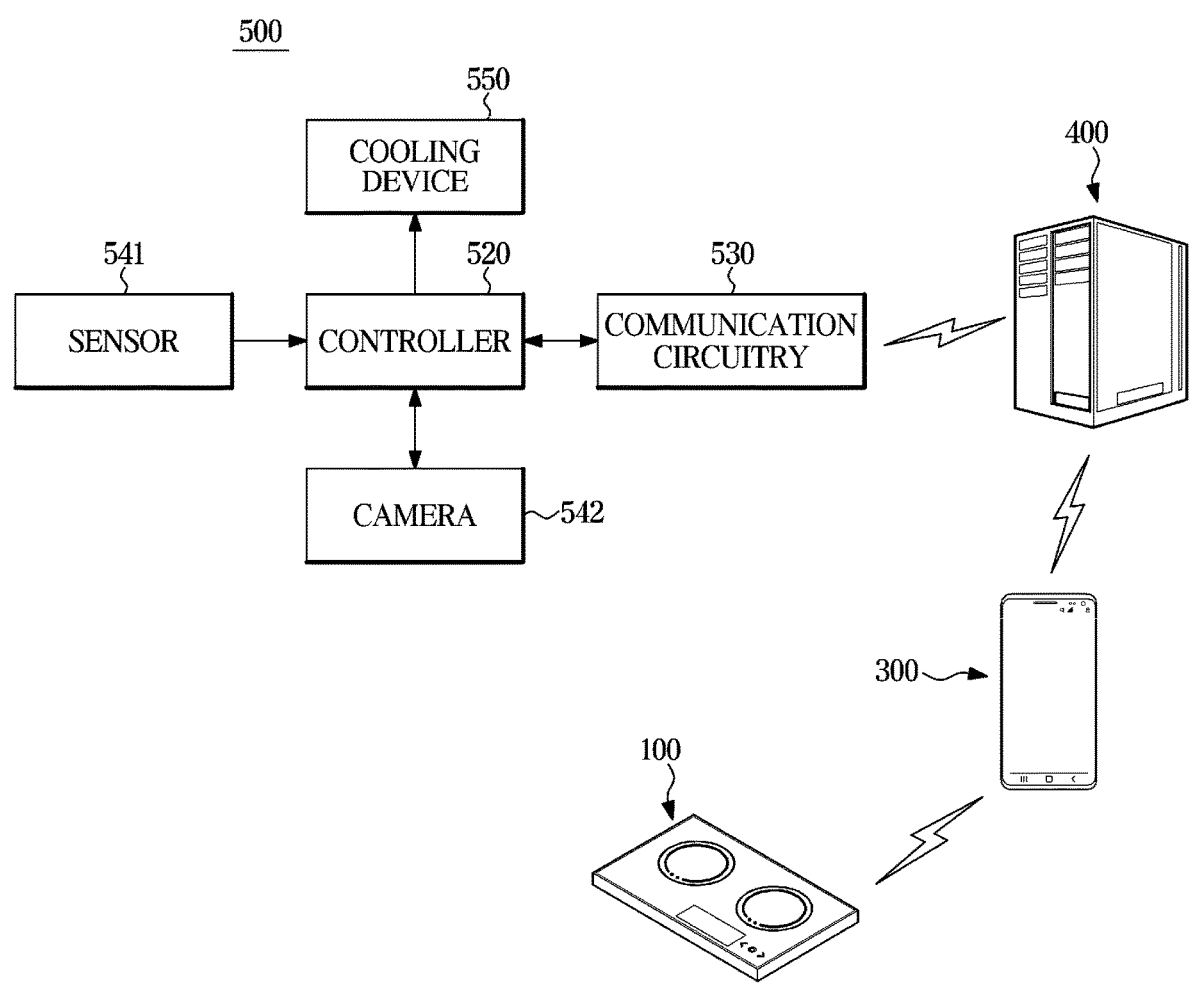
FIG. 11 is a control block diagram of other home appliances managed by a server according to an embodiment of the disclosure.
Figure 12:
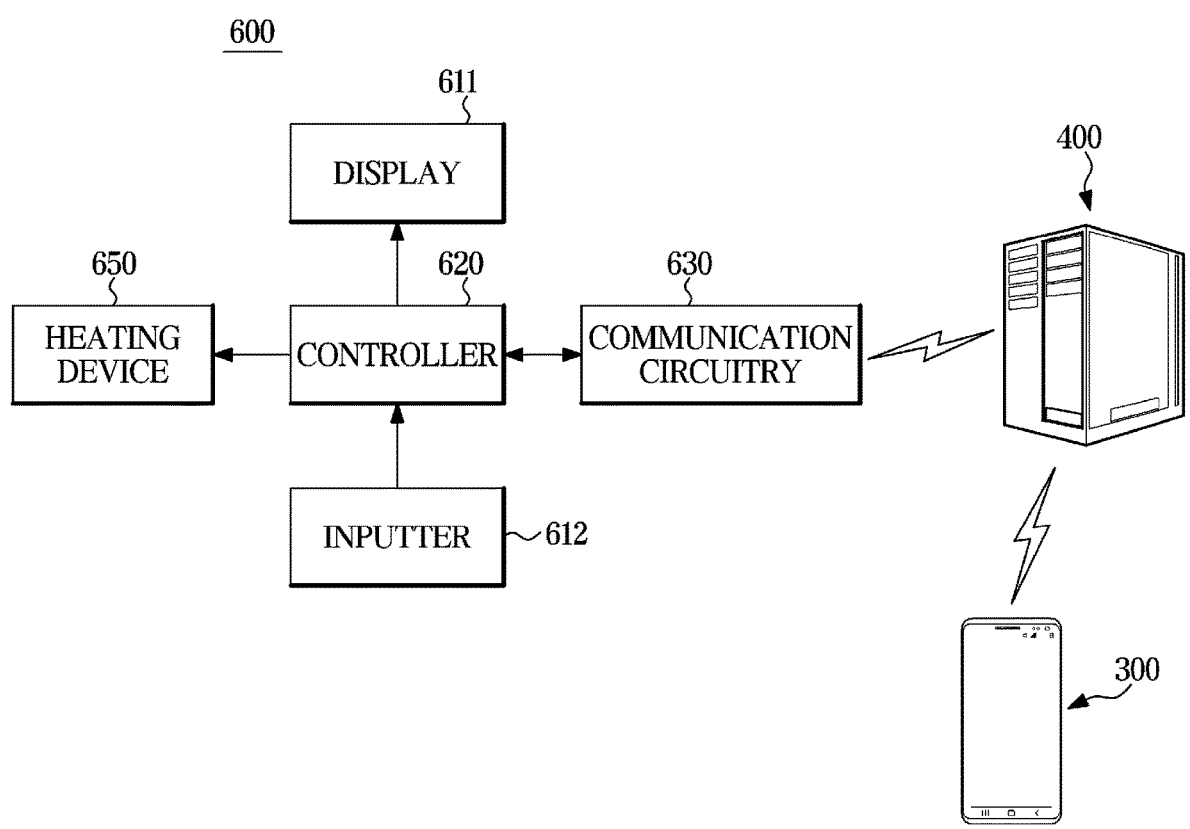
FIG. 12 is a control block diagram of other home appliances managed by the server according to an embodiment of the disclosure.

FIGS. 11 and 12 are control block diagrams of other home appliances managed by a server.

For example, as illustrated in FIG. 11, a refrigerator 500 may be managed by the server 400. A user may register the refrigerator 500 to the server 400 through the mobile device 300, and the registered refrigerator 500 may be managed by the server 400.

The server 400 may transmit information about the managed refrigerator 500 to the mobile device 300, and the mobile device 300 may display information about the refrigerator 500 on the display 311. In response to receiving a user input related to the control of the refrigerator 500 through the inputter 312, the mobile device 300 may transmit a signal corresponding to the received user input to the server 400. The server 400 may manage the refrigerator 500 by applying the received signal.

The refrigerator 500 may include a communication circuitry 530 configured to communicate with the server 400, a cooling device 550 configured to cool an inside of the refrigerator, a camera 542 configured to image items entering and leaving the refrigerator, a sensor 541 configured to detect opening and closing of a door of the refrigerator 500 or opening and closing of a door of a pantry inside the refrigerator, and a controller 520 configured to control an operation of the refrigerator 500.

Particularly, in response to a new food being put into the refrigerator 500, the sensor 541 and the camera 542 may image the received food, and the controller 520 may recognize the received food based on the obtained image.

In response to the information about the stored food being transmitted to the server 400 through the communication circuitry 530, the server 400 may generate at least one recommended dishes list related to the stored food, and the mobile device 300 may receive the generated recommended dishes list and display the generated recommended dishes list on the display 311.

In response to a user input for selecting one dish in the recommended dishes list being received through the inputter 312, the mobile device 300 may transmit information about a recipe of the selected dish to the wireless power transmission apparatus 100 or transmit information about the selected dish to the server 400.

Alternatively, as illustrated in FIG. 12, a cooking apparatus 600 may be managed by the server 400. In this example, a case in which the cooking apparatus 600 is an oven will be described as an example.

The oven 600 may include a communication circuitry 630 configured to communicate with the server 400 and a heating device 650 configured to heat a heating room inside the oven 600, and include a display 611 provided to display information about an operation of the oven 600 and an inputter 612 configured to receive a user input related to the operation of the oven 600.

If the same example as the above example is applied, one in the recommended dishes list is selected by a user and based on a recipe of the selected dish including the use of the oven 600, the server 400 may control the oven 600 to perform cooking according to the recipe of the selected dish.

Particularly, the server 400 may transmit cooking conditions (including cooking mode, temperature, time, etc.) according to the recipe of the selected dish, and the communication circuitry 630 of the oven 600 may receive the cooking conditions.

A controller 620 of the oven 600 may perform cooking by controlling the heating device 650 according to the received cooking condition.

In addition, the display 611 of the oven 600 may display information about the received cooking condition or information about a current operation of the oven 600, and a user may input a command for changing the operation of the oven 600 through the inputter 612.

Figure 13:
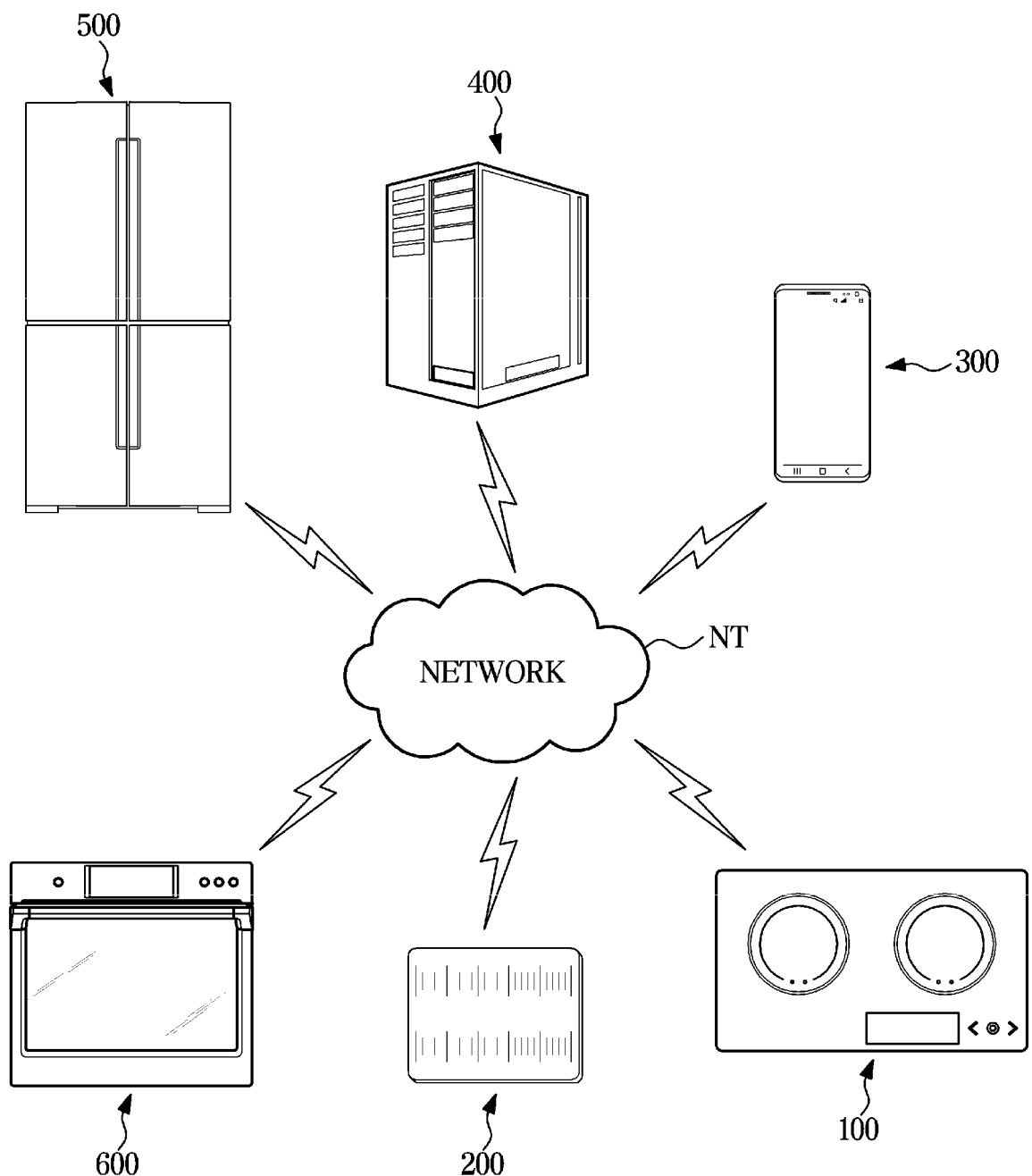
FIG. 13 is a view illustrating examples of devices connected to the wireless power transmission apparatus and the wireless electronic device through a network according to an embodiment of the disclosure.

FIG. 13 is a view illustrating examples of devices connected to the wireless power transmission apparatus and the wireless electronic device through a network according to an embodiment of the disclosure.

Summarizing the above examples, the wireless power transmission apparatus 100, the wireless electronic device 200, the mobile device 300, the server 400, the refrigerator 500, and the cooking apparatus 600 may be connected through the network NT and perform each role according to one recipe, thereby completing the dish, as illustrated in FIG. 13.

Particularly, in response to a new food being put into the refrigerator 500, the server 400 may generate a recommended dishes list related to the received food, and the mobile device 300 may display the generated recommended dishes list. In response to one dish in the recommended dishes list being selected by a user, the wireless power transmission apparatus 100 may display information about a recipe of the selected dish, and in response to the wireless electronic device 200 being placed in the wireless power transmission apparatus 100, the wireless power transmission apparatus 100 may control the wireless electronic device 200 to perform the cooking according the recipe.

Further, in response to the recipe including the use of the cooking apparatus 600, the server 400 may transmit a cooking condition according to the recipe to the cooking apparatus 600, and the cooking apparatus 600 may be operated according to the transmitted cooking condition.

A cooking management system according to an embodiment may include two or more devices connected through a network NT. For example, the cooking management system may include the wireless power transmission apparatus 100 and the wireless electronic device 200, may include the wireless power transmission apparatus 100 and the server 400, or may include the wireless power transmission apparatus 100 and the mobile device 300.

Hereinafter an operation performed by the wireless power transmission apparatus 100, the wireless electronic device 200, the mobile device 300, the server 400, the refrigerator 500, and the cooking apparatus 600 when assuming one specific situation, will be described in details.

Figure 14:
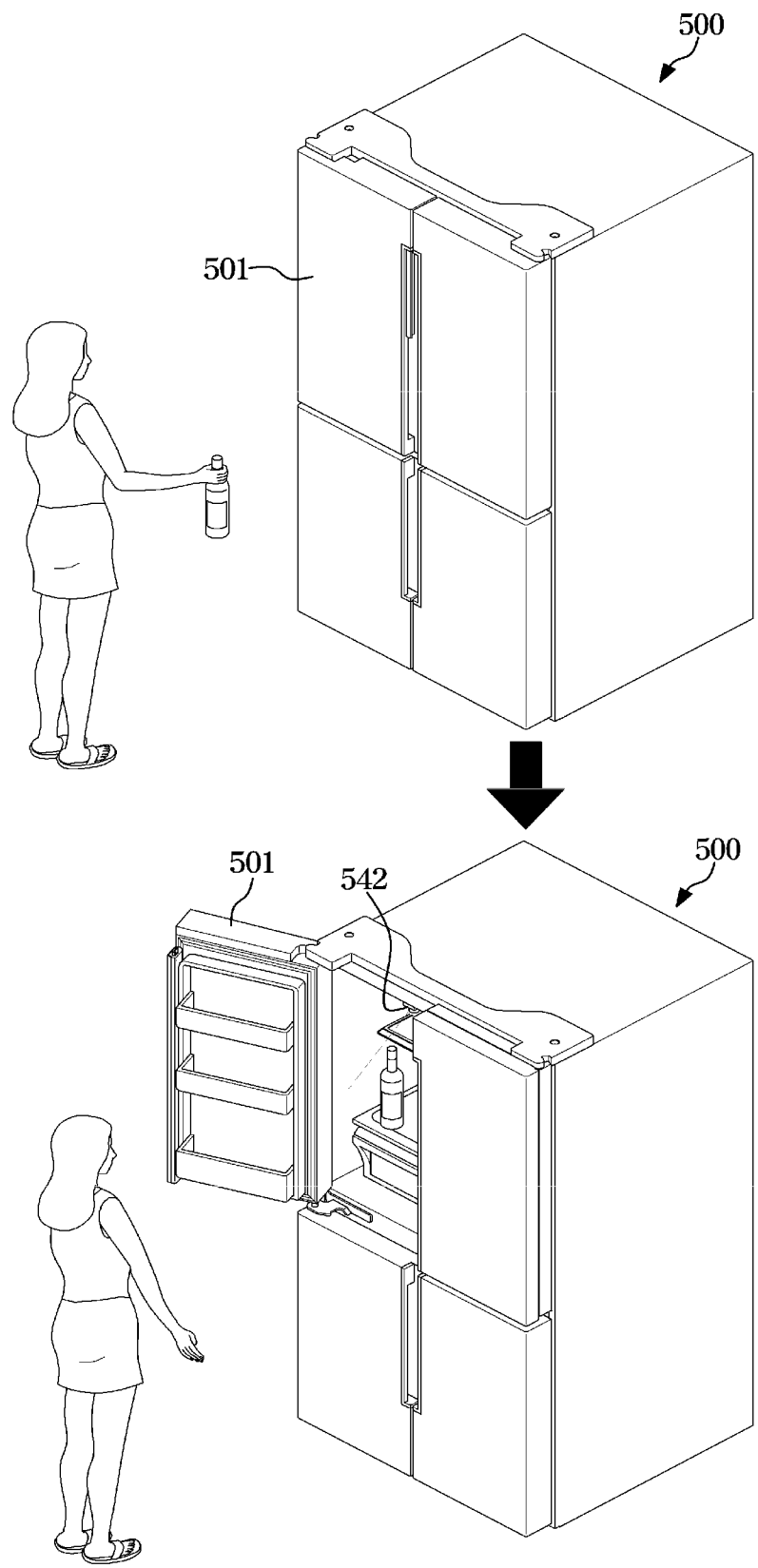
FIG. 14 is a view illustrating a situation occurring in a refrigerator according to an embodiment of the disclosure.
Figure 15:
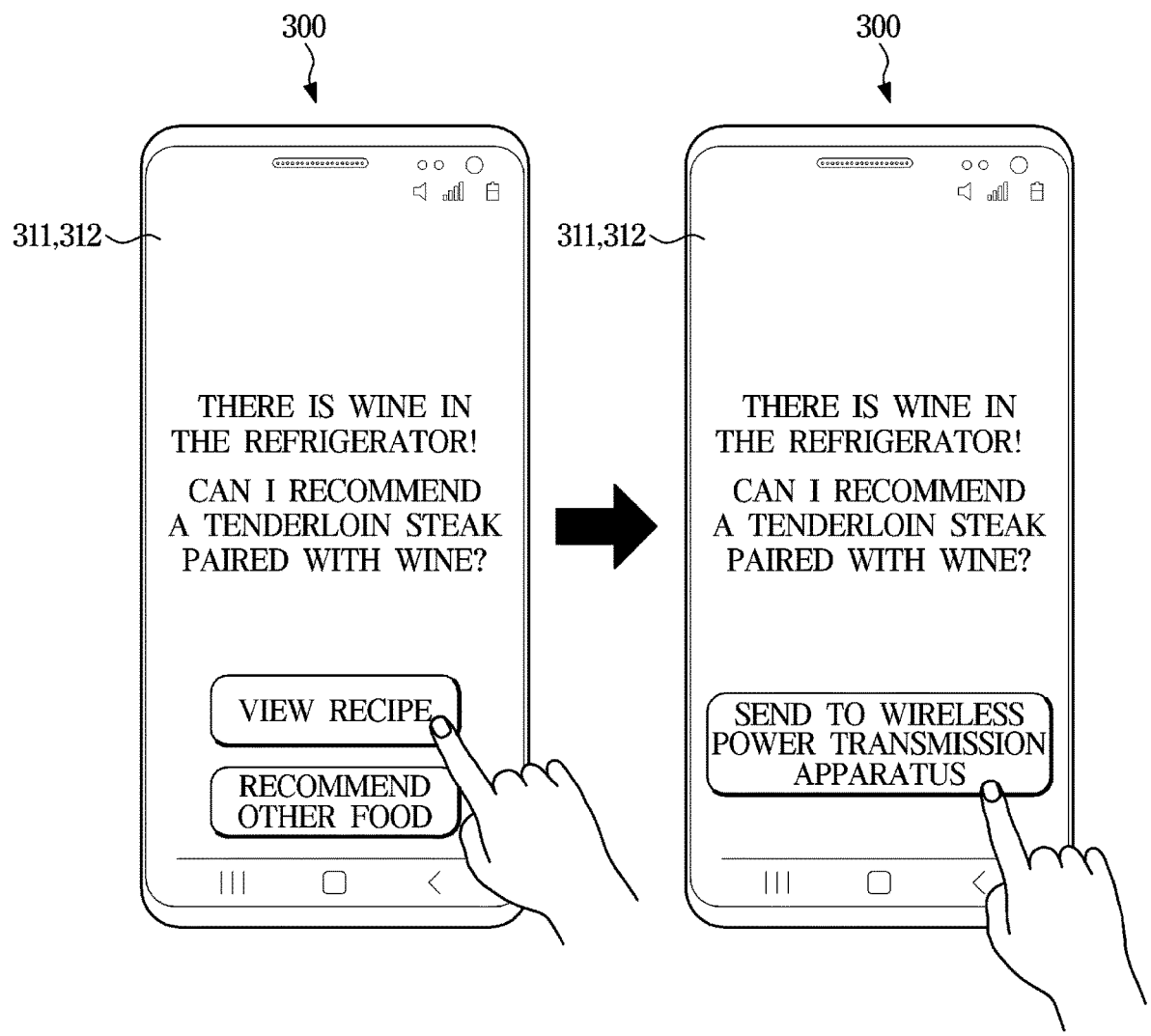
FIG. 15 is a view illustrating a screen displayed on the mobile device after food is put in the refrigerator according to an embodiment of the disclosure.
Figure 16:
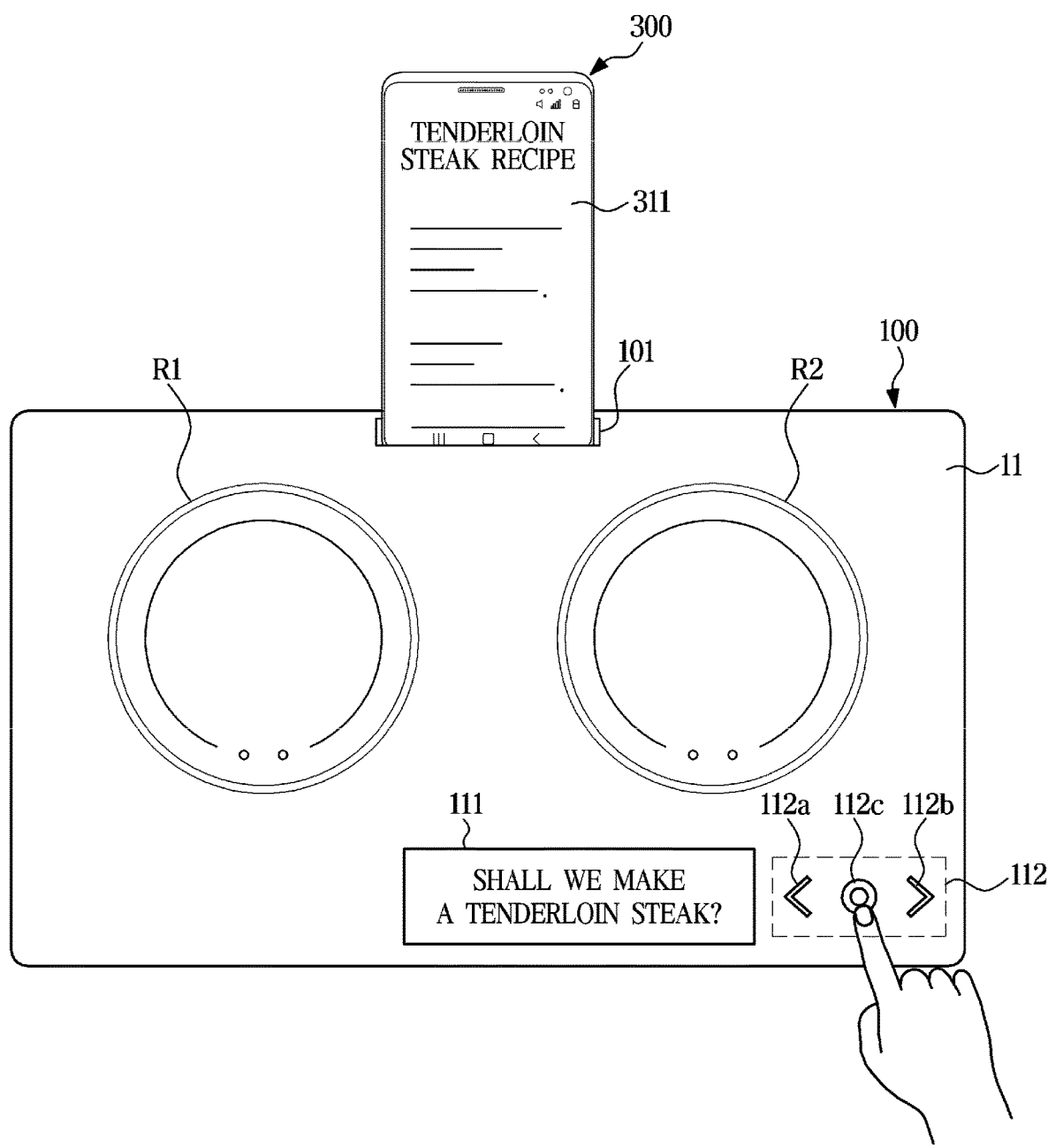
FIG. 16 is a view illustrating an operation of the wireless power transmission apparatus after the mobile device is mounted thereon according to an embodiment of the disclosure.

FIG. 14 is a view illustrating a situation occurring in a refrigerator, FIG. 15 is a view illustrating a screen displayed on the mobile device after a food is put in the refrigerator, and FIG. 16 is a view illustrating an operation of the wireless power transmission apparatus after the mobile device is mounted thereon.

As illustrated in FIG. 14, it is assumed that a user puts a bottle of wine into the refrigerator 500. In response to a door 501 of the refrigerator 500 being opened, the sensor 541 may detect the opening of the door 501, and the camera 542 provided in the refrigerator 500 may obtain a video or a plurality of still images.

The camera 542 may be mounted at a position where it is possible to recognize an item that is put into or taken out from the refrigerator 500 and it is possible to recognize whether the corresponding item is put into or taken out from the refrigerator 500 based on the obtained image. For example, the camera 542 may be mounted on an upper portion of the refrigerator 500 at an angle at which the camera 542 is capable of imaging a portion of an inside and a portion of an outside of the refrigerator 500.

The controller 520 may recognize the type of item based on the image obtained by the camera 542, and may determine whether the recognized item is put into the refrigerator 500 or is taken out from the refrigerator 500.

The controller 520 may transmit information about the type of the item and whether the corresponding item is put into or taken out, to the server 400 through the communication circuitry 530. In this example, information that wine is put into the refrigerator 500 may be transmitted to the server 400.

The server 400 configured to manage the refrigerator 500 may add the wine to a list of foods stored in the refrigerator 500 and may generate a recommended dishes list suitable for the wine. The generated recommended dishes list may be transmitted to the mobile device 300. As illustrated in FIG. 14, the mobile device 300 may display a guide screen for guiding selection of one dish in the recommended dishes list. In this example, it is assumed that the mobile device 300 includes a touch screen configured to perform the functions of the display 311 and the inputter 312.

The inputter 312 may receive a user input for selecting one dish included in the recommended dishes list. As in the example of FIG. 15, in response to a recipe view button being touched by a user, a tenderloin steak, which is a dish displayed on the guide screen, may be selected.

In addition, in response to a send button being selected after selecting the dish, the communication circuitry 330 may transmit the recipe of the selected dish to the wireless power transmission apparatus 100.

As illustrated in FIG. 16, a screen related to the received recipe, that is, a screen representing the received recipe, may be displayed on the display 111 of the wireless power transmission apparatus 100. In this case, the controller 120 may generate summary information summarizing the received recipe in consideration of the size of the display 111, and may display the generated summary information on the display 111. Accordingly, the screen displayed on the display 111 of the wireless power transmission apparatus 100 and the screen displayed on the display 311 of the mobile device 300 may be different from each other.

Further, even when a command for transmitting the recipe to the wireless power transmission apparatus 100 is not input on the mobile device 300, the recipe may be automatically transmitted upon mounting the mobile device 300 on the wireless power transmission apparatus 100, as illustrated in FIG. 15. In response to the mobile device 300 being mounted on a cradle 101 of the wireless power transmission apparatus 100, the wireless power transmission apparatus 100 and the mobile device 300 may be connected through Bluetooth to exchange necessary information with each other. Alternatively, the recipe of the selected dish may be transmitted from the server 400 to the wireless power transmission apparatus 100.

In response to a user input for approving cooking of the tenderloin steak being received through the inputter 112, cooking of the tenderloin steak using the wireless power transmission apparatus 100 may be started.

FIGS. 17 to 21 are views illustrating operations performed by the wireless power transmission apparatus, the mobile device, and the electronic cutting board in a material preparation step.

Figure 17:
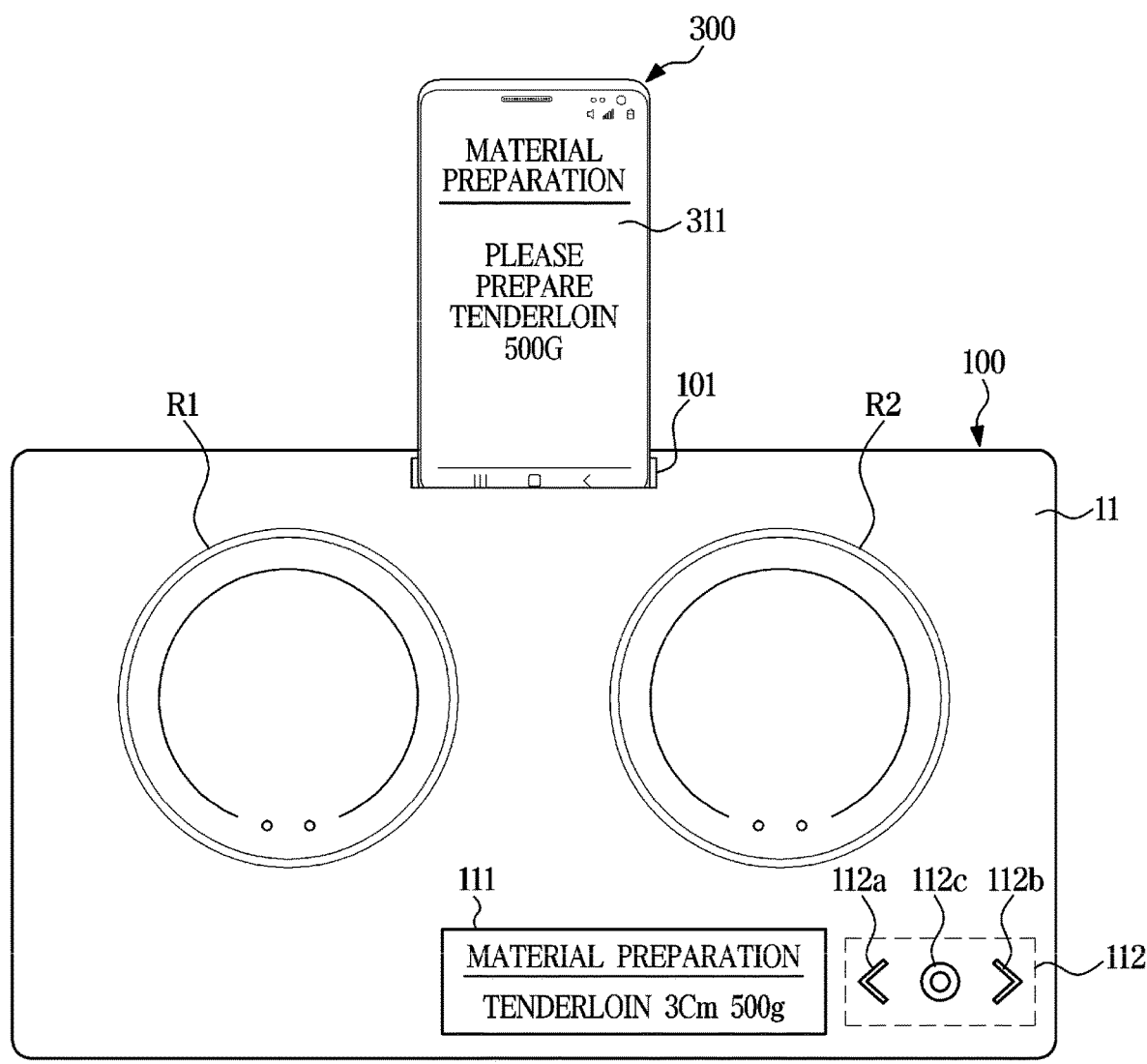
FIG. 17 is a view illustrating operations performed by the wireless power transmission apparatus, the mobile device, and the electronic cutting board in a material preparation step according to an embodiment of the disclosure.

When the cooking of the tenderloin steak starts, a screen for explaining a material preparation step among a plurality of cooking steps constituting the recipe may be displayed on the display 311 of the mobile device 300 and on the display 111 of the wireless power transmission device 100, as illustrated in FIG. 17.

The screens displayed on the displays 311 and 111 of the mobile device 300 and the wireless power transmission apparatus 100 connected through Bluetooth may interwork with each other. That is, in response to the screen, which is displayed on the display 111 of the wireless power transmission apparatus 100, being switched, the screen displayed on the display 311 of the mobile device 300 may also be switched correspondingly. Conversely, in response to the screen displayed on the display 311 of the mobile device 300 being switched, the screen displayed on the display 111 of the wireless power transmission apparatus 100 may also be switched correspondingly.

Further, in response to the switching of the screen displayed on the displays 111 and 311, a cooking step indicated by the switched screen may be converted into voice and the voice may be output through a speaker provided in the mobile device 300 or the wireless power transmission apparatus 100.

As in the example of FIG. 17, in response to receiving a user input for starting cooking of the tenderloin steak through the inputter 112 of the wireless power transmission apparatus 100, a screen for explaining the material preparation step may be displayed on the display 111 of the wireless power transmission apparatus 100, and in conjunction with this, a screen for explaining the material preparation step may be displayed on the mobile device 300 as well. As described above, because summary information is displayed on the display 111 of the wireless power transmission apparatus 100, the screen displayed on the display 311 of the mobile device 300 may be different from the screen displayed on the display 111 of the wireless power transmission apparatus 100.

Figure 18:
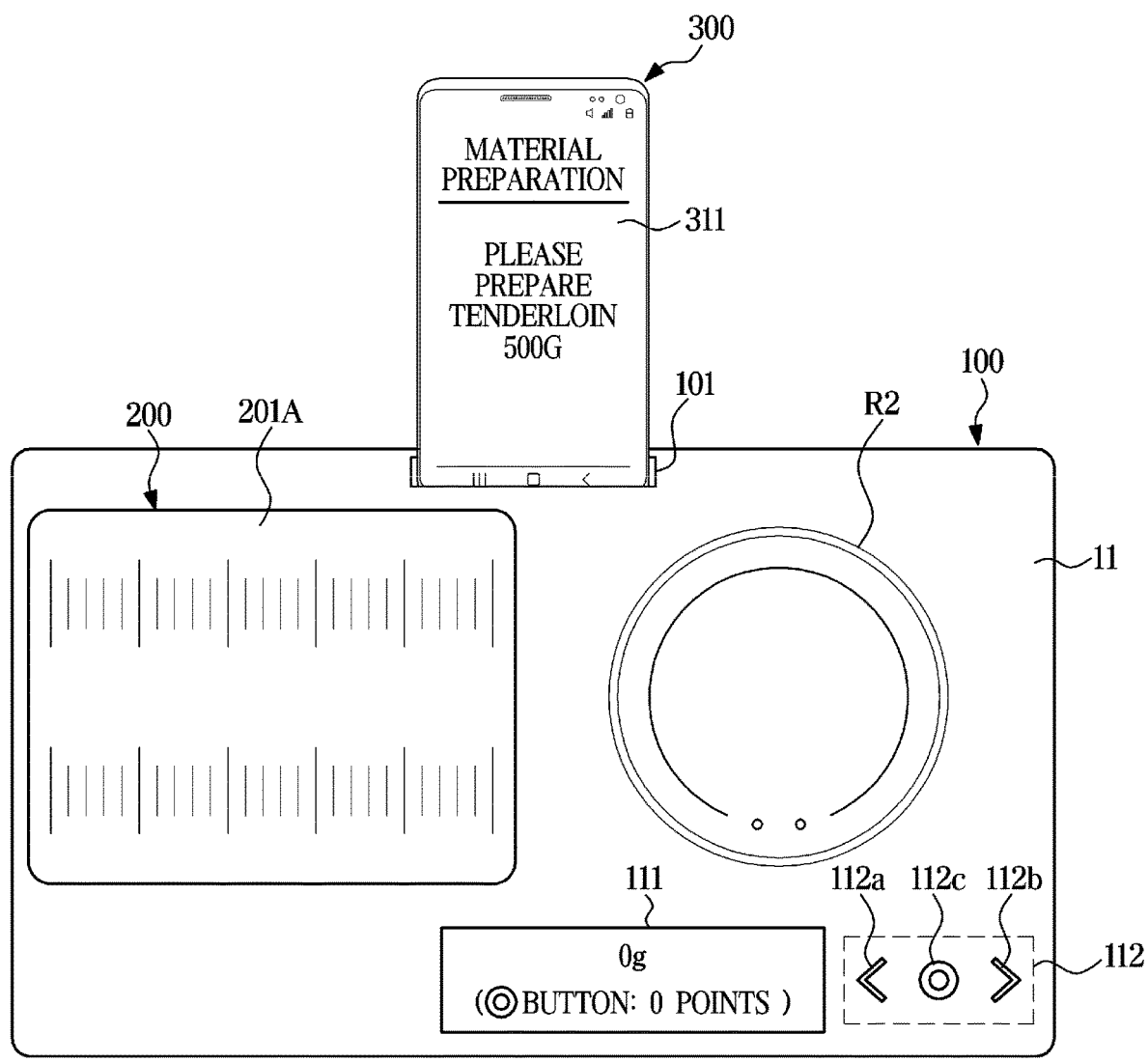
FIG. 18 is a view illustrating operations performed by the wireless power transmission apparatus, the mobile device, and the electronic cutting board in the material preparation step according to an embodiment of the disclosure.

As illustrated in FIG. 18, a user may place the electronic cutting board 200A in the driving region R on the plate 11 of the wireless power transmission apparatus 100 for the material preparation. According to the embodiment, information about the wireless electronic device 200 or a cooking vessel corresponding to the current cooking step may be displayed on the display 111 so as to allow the user to place the appropriate wireless electronic device 200 or cooking vessel on the plate 11.

In a case in which two transmitting coils 150 are provided, the electronic cutting board 200A may be arranged in one driving region R1 of the two driving regions R1 and R2. In response to the electronic cutting board 200A being placed in the driving region R1, the NFC reader included in the communication circuitry 130 of the wireless power transmission apparatus 100 may obtain identification information recorded on an NFC tag included in the communication circuitry 230 of the electronic cutting board 200A. The controller 120 of the wireless power transmission apparatus 100 may recognize that the electronic cutting board 200A is arranged based on the obtained identification information, and transmit wireless power to the electronic cutting board 200A by controlling the driving circuit 140.

In addition, the electronic cutting board 200A and the wireless power transmission apparatus 100 may be connected through wireless communication configured to exchange information in real time, such as Bluetooth.

In response to the electronic cutting board 200A being connected to the wireless power transmission apparatus 100 through the wireless communication, the electronic cutting board 200A may indicate the connection by turning on the LEDs indicating a scale included in the display 211 according to a predetermined method. For example, the electronic cutting board 200A may sequentially turn on the LEDs indicating a scale.

In response to the wireless power transmission apparatus 100 being connected to the electronic cutting board 200A, the wireless power transmission apparatus 100 may display a screen for assisting a kitchen scale function of the electronic cutting board 200A on the display 111. For example, in response to a weight measured by the weight sensor 241 being transmitted to the wireless power transmission apparatus 100, the controller 120 may display the transmitted weight on the display 111.

In addition, a user may set a zero point by manipulating the inputter 112, and thus information for guiding an operation for adjusting the zero point may be displayed on the display 111, as illustrated in FIG. 18.

Figure 19:
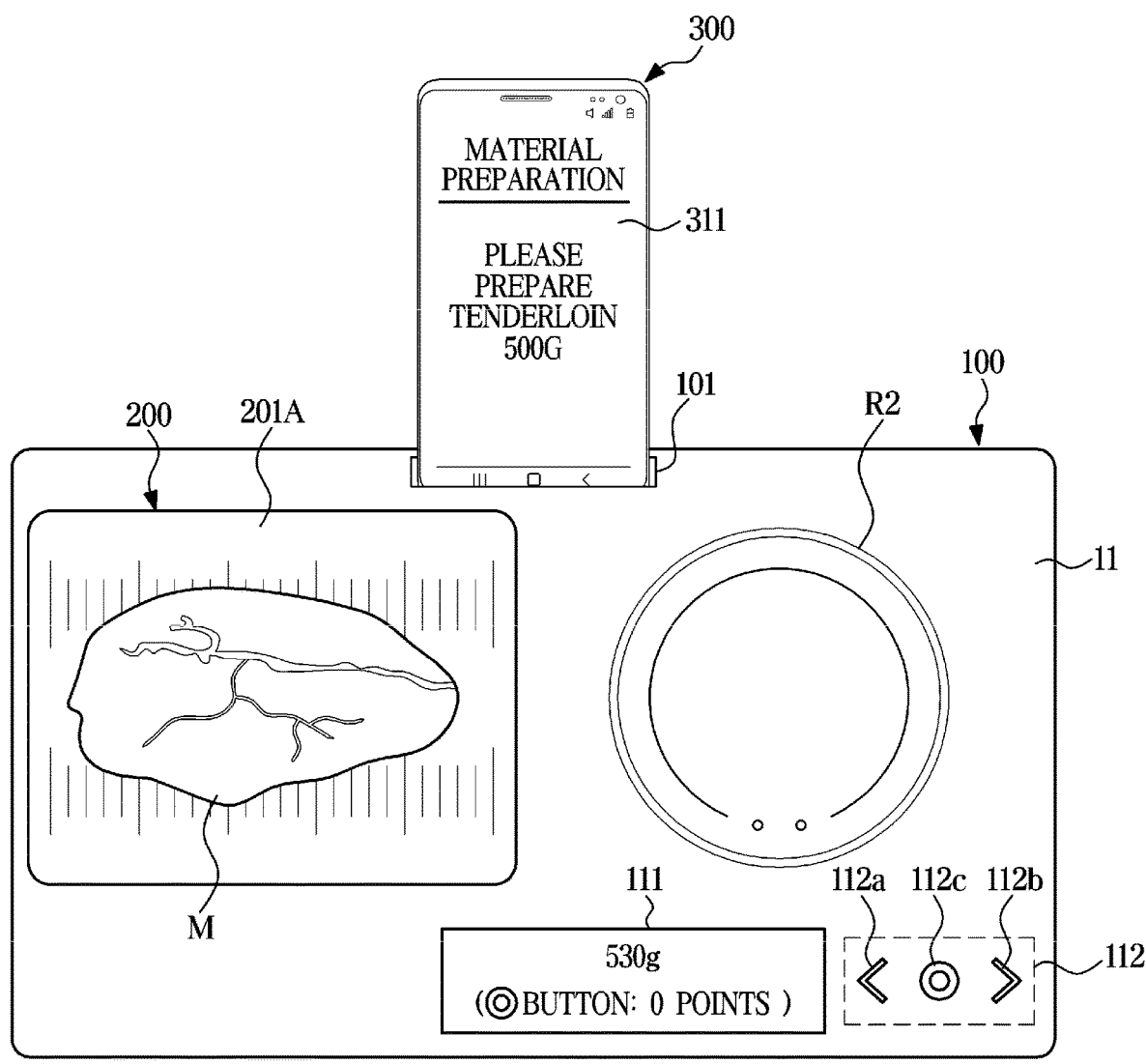
FIG. 19 is a view illustrating operations performed by the wireless power transmission apparatus, the mobile device, and the electronic cutting board in the material preparation step according to an embodiment of the disclosure.

As illustrated in FIG. 19, a tenderloin M, which is a material, may be placed on the plate 201A of the electronic cutting board 200A, and a weight 530 g of the tenderloin M measured by the weight sensor 241 may be transmitted to the wireless power transmission apparatus 100. As described above, the wireless power transmission apparatus 100 displays the transmitted weight on the display 111.

As illustrated in FIG. 17 described above, the wireless power transmission apparatus 100 receives a target weight 500 g of the material. The wireless power transmission apparatus 100 may transmit the received target weight 500 g to the electronic cutting board 200A, and the controller 220 of the electronic cutting board 200A may determine a target cutting length of the tenderloin M based on a difference between the target weight 500 g and the measured weight 530 g. The target cutting length represents a length that is cut to reduce the weight of the tenderloin M to the target weight.

Alternatively, in determining the target cutting length of the tenderloin M, the output of the touch sensor 242 may be further used. The touch sensor 242 may detect contact of the plate 201A with the material, and the output of the touch sensor 242 may indicate an area of the material. The controller 220 may determine the target cutting length based on the difference between the target weight and the measured weight, and based on the output of the touch sensor 242.

Further, the display 211 may also display the location and area of the material on the plate 201A based on the output of the touch sensor 242. For example, the display 211 may display scales corresponding to opposite ends of the material, and scales between these scales together therewith.

Alternatively, the target cutting length may be determined by the controller 120 of the wireless power transmission apparatus 100. Even in this case, the process of determining the target cutting length may be the same as described above, and when the area of the material is used, the output of the touch sensor 242 may be provided from the electronic cutting board 200A.

Alternatively, in response to using the electronic cutting board 200A regardless of the recipe, a user may set the target weight by manipulating the inputter 112. The same manner as described above may be applied to an operation of displaying the cutting guide to prepare a material having a target weight.

Figure 20:
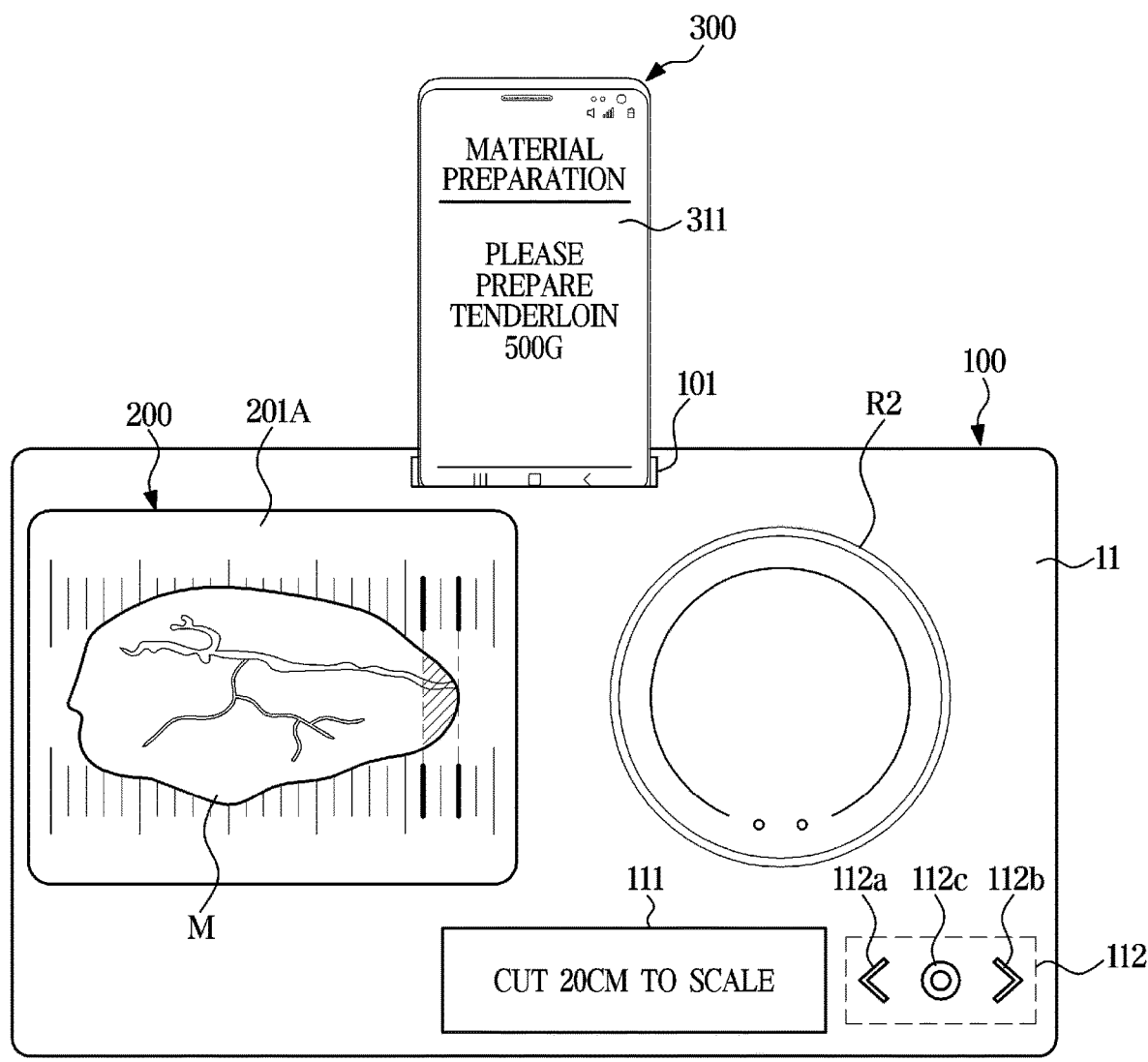
FIG. 20 is a view illustrating operations performed by the wireless power transmission apparatus, the mobile device, and the electronic cutting board in the material preparation step according to an embodiment of the disclosure.

The controller 220 may control the display 211 to display a cutting guide corresponding to the target cutting length. The cutting guide may include a graphic object provided to guide for a user to cut the material by the target cutting length. When the display 211 displays scales spaced apart by a predetermined interval, as illustrated in FIG. 20, the display 211 may display only scales indicating the target cutting length, display scales indicating the target cutting length darker than other scales, or display scales indicating the target cutting length in a different color. For example, in response to displaying each scale by individually controlled by the LEDs, only the LED of the scale indicating the target cutting length may be turned on and the remaining LEDs may be turned off.

In this case, guide information for cutting according to the scale may be displayed on the display 111 of the wireless power transmission apparatus 100.

Figure 21:
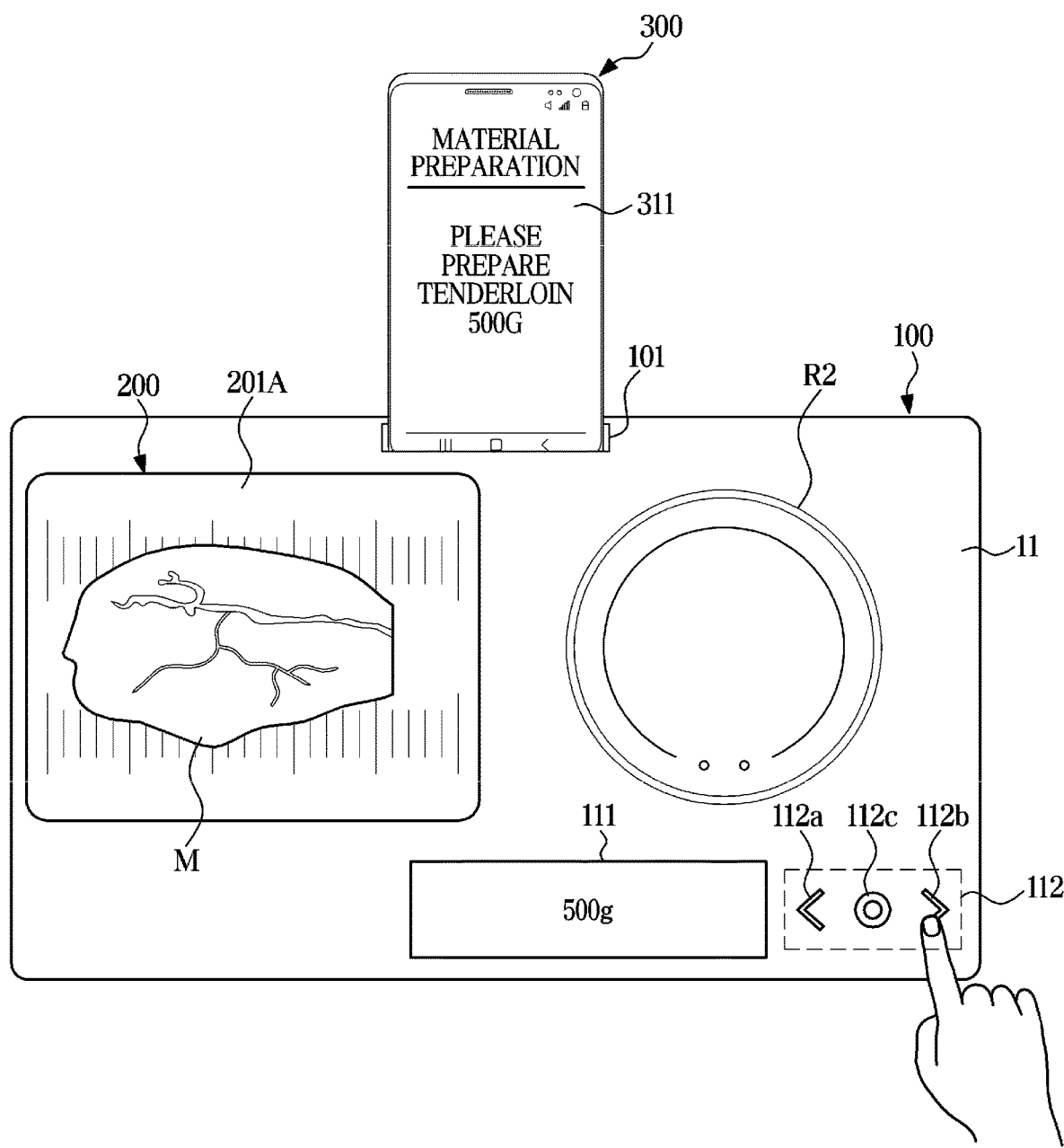
FIG. 21 is a view illustrating operations performed by the wireless power transmission apparatus, the mobile device, and the electronic cutting board in the material preparation step according to an embodiment of the disclosure.

After the user cuts the tenderloin M according to the cutting guide displayed on the display 211 and in response to the weight measured by the weight sensor 241 reaching the target weight 500 g or reaching a weight within a predetermined error range with the target weight, it is possible to move to the next cooking step. It is also possible to automatically move to the next cooking step, and as illustrated in FIG. 21, it is also possible to move to the next cooking step according to a user input received by the inputter 112.

The controller 120 of the wireless power transmission apparatus 100 may control the display 111 to display information about the next cooking step, and transmit a screen switching command or a cooking step movement command through the communication circuitry 130 for interworking with the screen of the mobile device 300. The mobile device 300 may display a screen indicating information about the next cooking step according to the received command.

Figure 22:
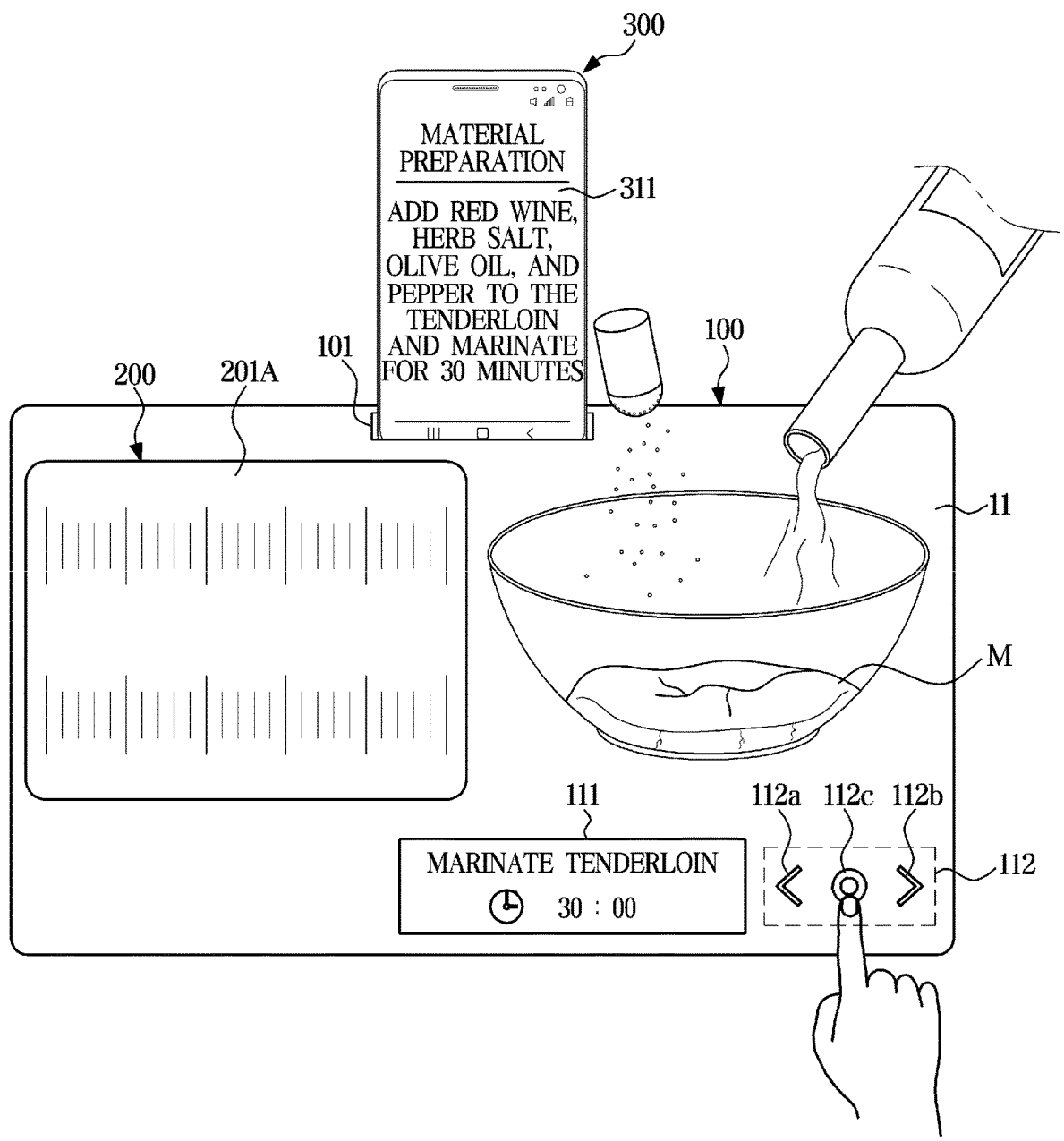
FIG. 22 is a view illustrating another process for the material preparation according to an embodiment of the disclosure.
Figure 23:
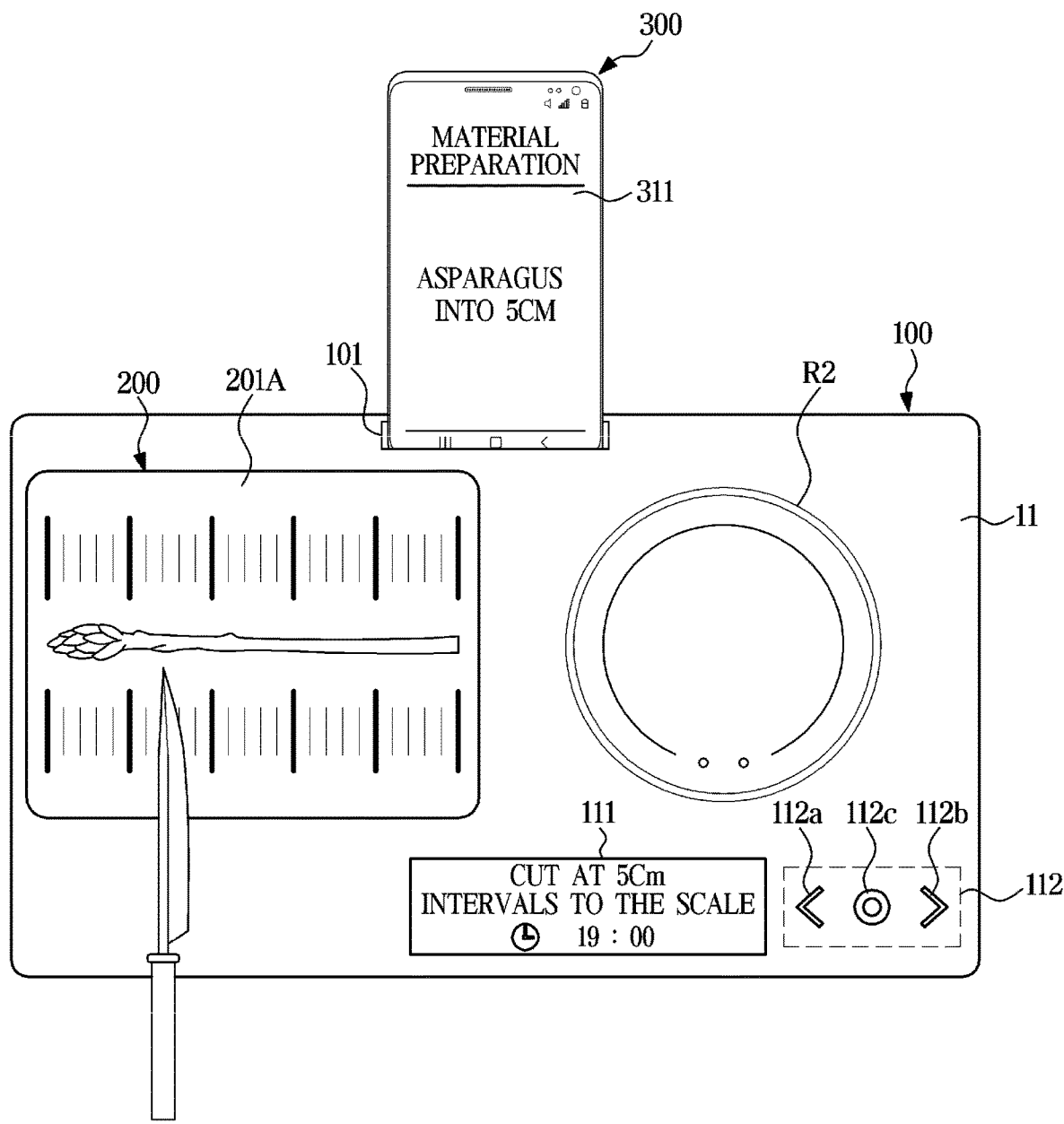
FIG. 23 is a view illustrating another process for the material preparation according to an embodiment of the disclosure.

FIGS. 22 and 23 are views illustrating another process for the material preparation.

After the required weight of tenderloin M is prepared by the cutting guide operation of the electronic cutting board 200A described above, it is possible to move to the next cooking step that is a tenderloin marinating step. As illustrated in FIG. 22, the display 311 of the mobile device 300 and the display 111 of the wireless power transmission apparatus 100 may display information about the tenderloin marinating step.

As illustrated in FIG. 22, in response to an operation, which is to be performed for a predetermined time, being included in the current cooking step, the wireless power transmission apparatus 100 may perform a timer function. The controller 120 may set a timer according to a predetermined time, and may display timer information on the display 111.

In this example, because a process of marinating the tenderloin for 30 minutes is to be performed, the timer may be set to 30 minutes, and related information may be displayed on the display 111. A count of the timer may be started by a user input received through the inputter 112.

In response to the timer starting counting, it is possible to move to the next cooking step that may be performed during the marination of the tenderloin. In an example of FIG. 23, it is assumed that it moves to a preparation step of materials other than the tenderloin. It is possible to automatically move to the next cooking step in response to the timer starting counting, or it is possible to move to the next cooking step according to a user input received by the inputter 112.

The controller 120 of the wireless power transmission apparatus 100 may control the display 111 to display information about the next cooking step, and transmit the screen switching command or the cooking step movement command through the communication circuitry 130 for interworking with the screen of the mobile device 300. The mobile device 300 may display a screen indicating information about the next cooking step according to the received command.

As illustrated in FIG. 23, in response to an operation of cutting other material (asparagus) by a predetermined length, which is included in the current cooking step, the controller 120 of the wireless power transmission apparatus 100 may display a cutting guide on the display 111 based on information about the cutting length received from the mobile device 300.

For example, based on 5 cm of the predetermined cutting length, the display 211 may display only scales indicating 5 cm interval, display the scales darker than other scales, or display the scales in a different color, as illustrated in FIG. 23. For example, in a case in which each scale is displayed by the LEDs individually controlled, only the LED of the scale indicating 5 cm interval may be turned on and the remaining LEDs may be turned off.

Meanwhile, the count of the timer may be continued while the preparation of other materials is in progress, and the display 111 of the wireless power transmission apparatus 100 may also display timer information together with information related to the preparation of other materials.

In response to the completion of the cutting of other materials, it is possible to move to the next cooking step by the user's manipulation of the inputter 112 or by the completion of the count of the timer.

Figure 24:
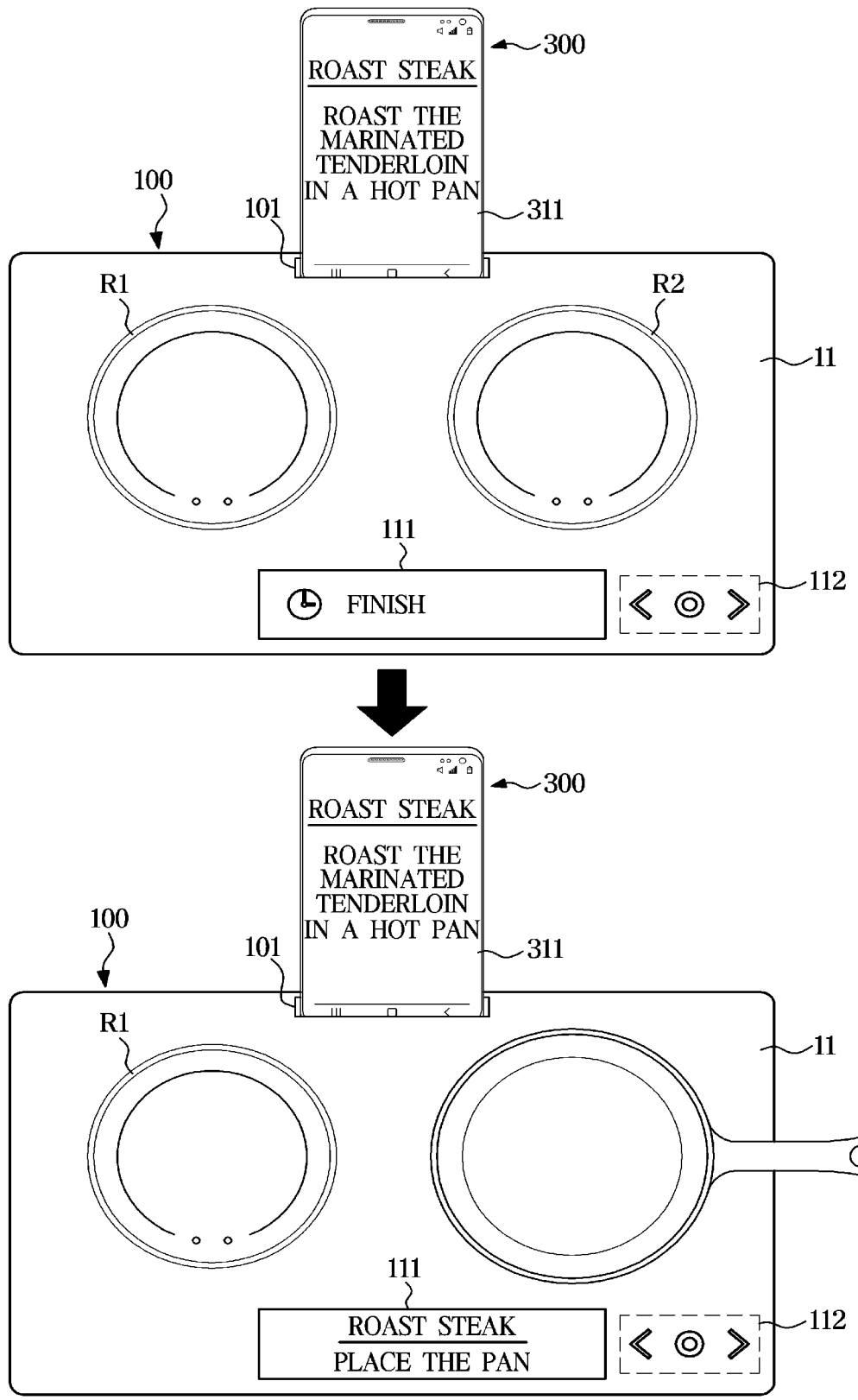
FIG. 24 is a view illustrating a cooking step in which an induction is used as the wireless power transmission apparatus according to an embodiment of the disclosure.
Figure 25:
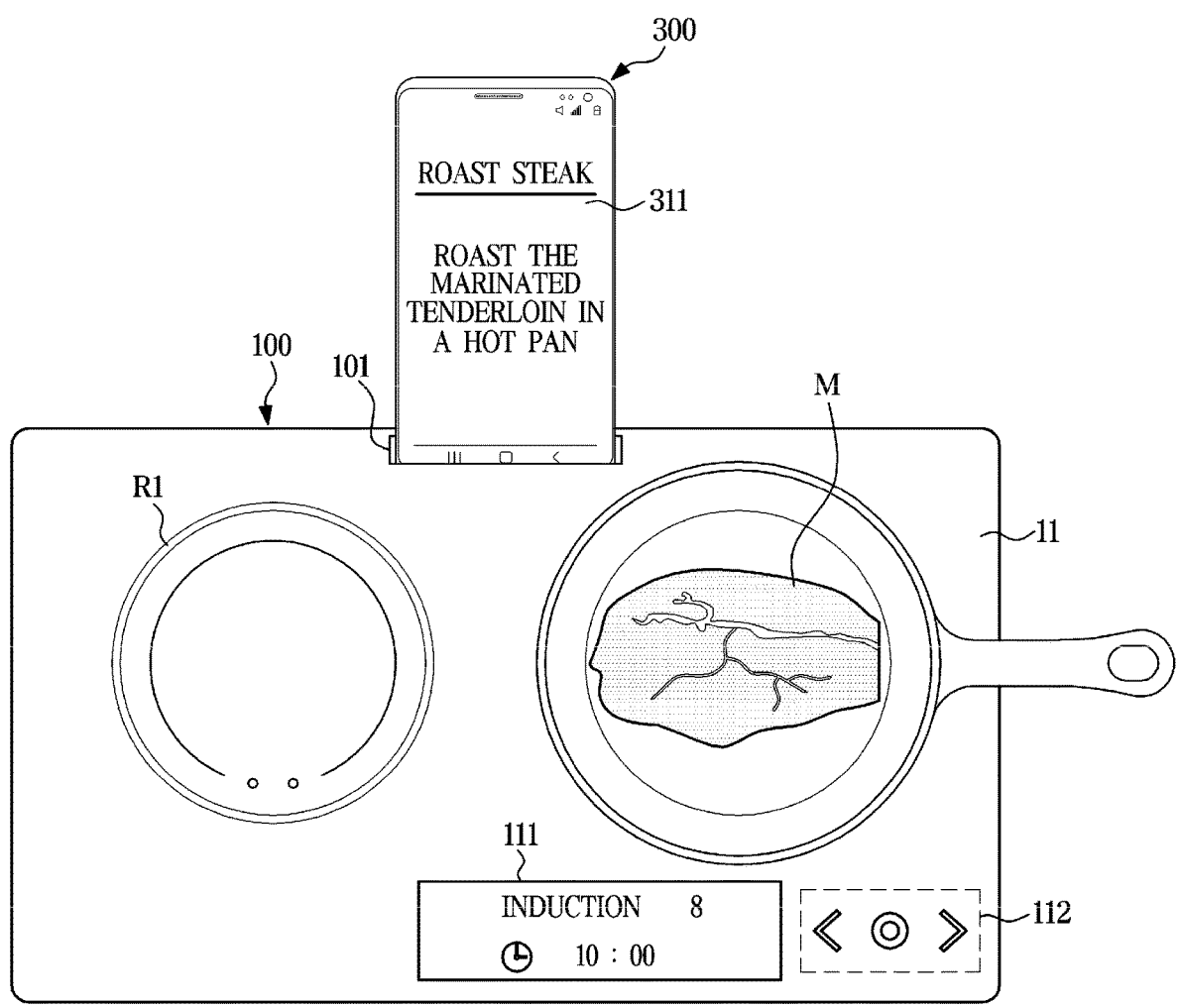
FIG. 25 is a view illustrating the cooking step in which the induction is used as the wireless power transmission apparatus according to an embodiment of the disclosure.

FIGS. 24 and 25 are views illustrating a cooking step in which an induction is used as the wireless power transmission apparatus.

In response to the completion of the count of the timer, that is, in response to the lapse of the time set in the timer, a screen indicating that the count of the timer is completed may be displayed on the display 111 of the wireless power transmission apparatus 100 as illustrated in FIG. 24, and according to embodiments, a voice indicating that the count of the timer is completed may be output through a speaker provided in the wireless power transmission apparatus 100 or a speaker provided in the mobile device 300.

In response to the completion of the count of the timer, it is possible to move to the related cooking step. In this example, it is possible to move to a cooking step of roasting the tenderloin marinated for a predetermined time in a pan. The cooking step movement command may be transmitted to the mobile device 300, and as illustrated in FIG. 24, information about a steak roasting step may be displayed on the display 311 of the mobile device 300. Information about the steak roasting step may also be displayed on the display 111 of the wireless power transmission apparatus 100.

Meanwhile, as for the interworking with the screen of the wireless power transmission apparatus 100 and the mobile device 300, there is no restriction on the order of screen switching. That is, as for transmitting the screen switching command or the cooking step movement command from the wireless power transmission apparatus 100 to the mobile device 300, the screen displayed on the display 111 of the wireless power transmission apparatus 100 may be switched first and the screen displayed on the display 311 of the mobile device 300 may be switched later, or conversely, the screen displayed on the display 311 of the mobile device 300 may be switched first, and the screen displayed on the display 111 of the wireless power transmission apparatus 100 may be switched later. The same applies to the case of transmitting the screen switching command or the cooking step movement command from the mobile device 300 to the wireless power transmission apparatus 100.

Referring to FIG. 25, in response to the cooking vessel being arranged in the driving region R of the wireless power transmission apparatus 100, the wireless power transmission apparatus 100 may perform an induction function. The wireless power transmission apparatus 100 may recognize the arranged cooking vessel using a sensor provided on the plate 11 and automatically set an intensity of induction according to the recipe.

Information about an operating condition of the induction may be displayed on the display 111. For example, information about the intensity of induction and a cooking time may be displayed.

In a state in which the plurality of driving regions R is provided, the controller 120 may recognize the driving region R2 in which the cooking vessel is arranged, and may control the driving circuit 140 in the transmitting coil 152 corresponding to the driving region R2, in which the cooking vessel is arranged, so as to provide a current corresponding to the set intensity of the induction. The controller 120 may terminate the induction function in response to the lapse of the set cooking time.

Figure 26:
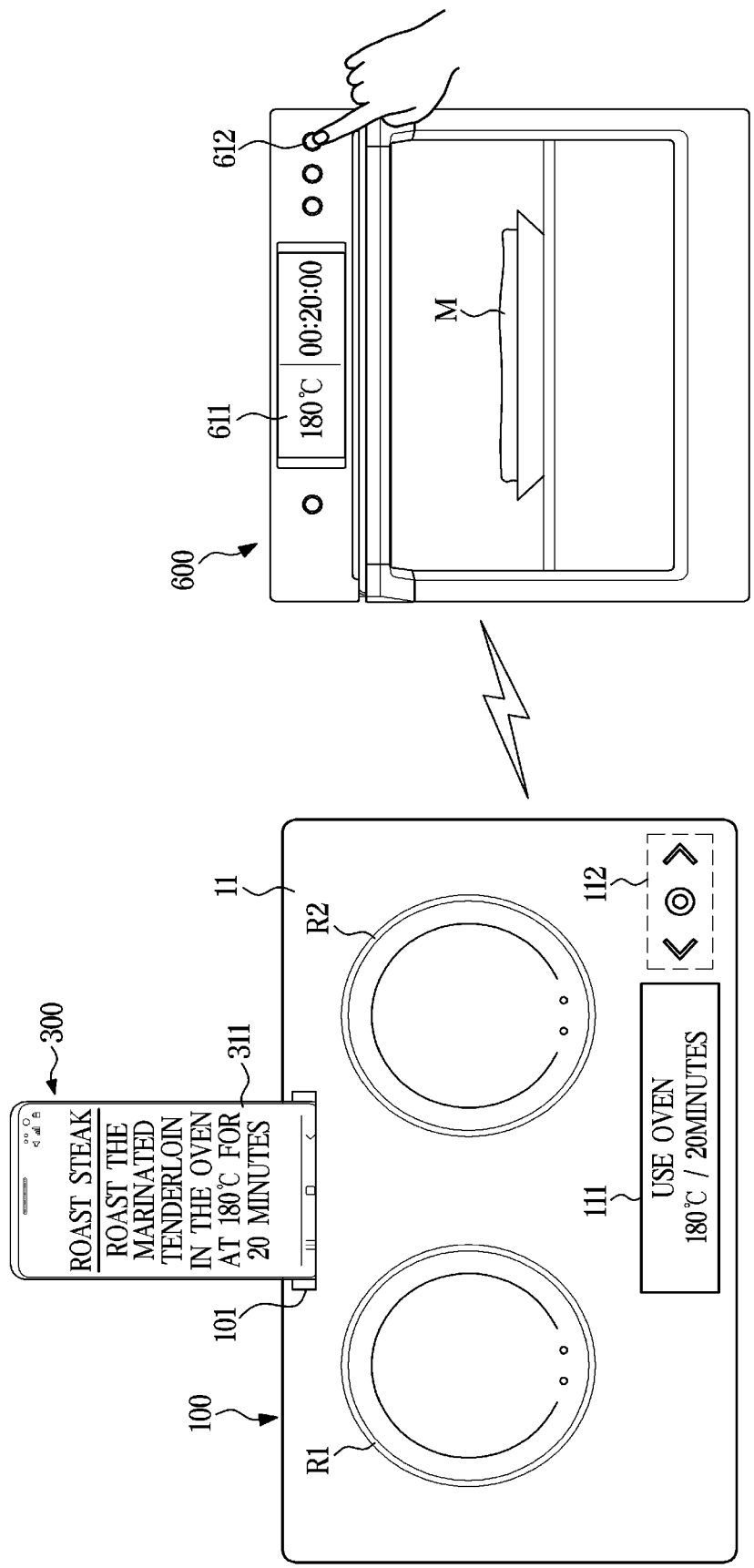
FIG. 26 is a view illustrating a case of using a cooking appliance for cooking according to a recipe according to an embodiment of the disclosure.
Figure 27:
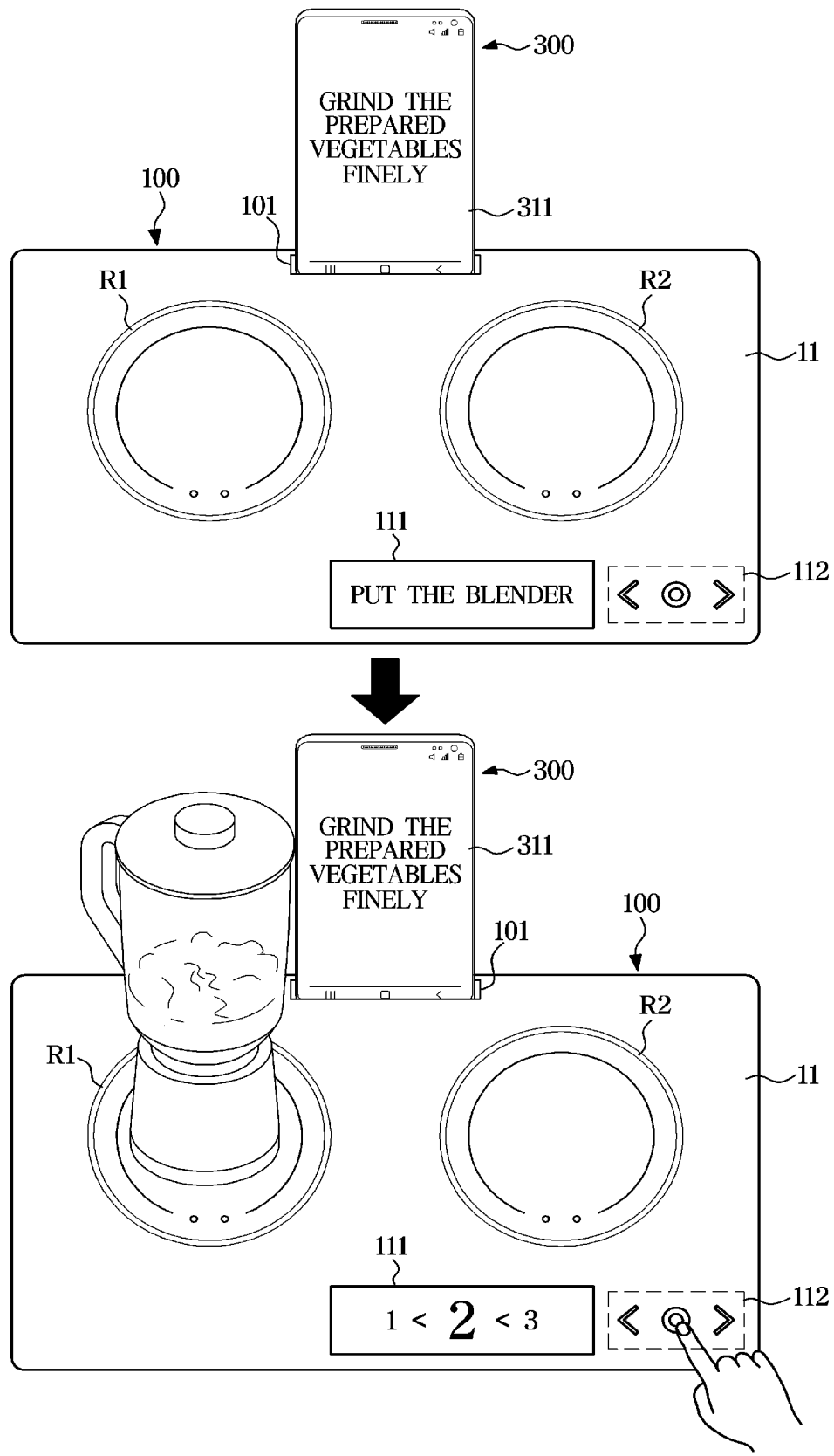
FIG. 27 is a view illustrating a case of using a small appliance other than the electronic cutting board for cooking according to a recipe according to an embodiment of the disclosure.

FIG. 26 is a view illustrating a case of using a cooking appliance for cooking according to a recipe, and FIG. 27 is a view illustrating a case of using a small appliance other than an electronic cutting board for cooking according to a recipe.

As illustrated in FIG. 26, it is also possible that the marinated tenderloin is roasted in the oven 600 rather than the wireless power transmission apparatus 100. The display 311 of the mobile device 300 and the display 111 of the wireless power transmission apparatus 100 may display information about cooking conditions (temperature, and time) of the oven 600 for roasting the tenderloin.

The server 400 may transmit cooking conditions according to the recipe to the oven 600, and the controller 620 of the oven 600 may control the heating device 650 according to the received cooking conditions to perform cooking.

In addition, the display 611 of the oven 600 may display information about the received cooking condition. In response to placing a prepared material (marinated tenderloin) in the oven 600 by a user, and in response to manipulating an inputter 612 by the user, the cooking may start.

In addition, the user may check the cooking condition displayed on the display 611 and change the cooking condition by manipulating the inputter 612.

As illustrated in FIG. 27, it is also possible that the use of the blender 200B, which is a small appliance other than the electronic cutting board 200A, may be included in the cooking step. In this case, a screen for guiding the use of the blender may be displayed on the display 111 of the wireless power transmission apparatus 100.

In response to placing the blender 200B in the driving region R1 by a user, the NFC reader of the wireless power transmission apparatus 100 may obtain identification information recorded in an NFC tag of the blender 200B. The controller 120 may confirm that the blender 200B is arranged, based on the obtained identification information, and the wireless power transmission apparatus 100 and the blender 200B are connected through Bluetooth to be in a state of exchanging information with each other.

The controller 120 may set an operating condition (strength) of the blender 200B in response to the recipe, and may display the set operating condition on the display 111. The user may manipulate the inputter 112 to input an operation command of the blender 200B or change an operating condition of the blender 200B.

In response to the operation command being input through the inputter 112, the wireless power transmission apparatus 100 may transmit a control command for operating the blender 200B according to the set operating conditions through Bluetooth, and the blender 200B may be operated according to the transmitted control command.

Figure 28:
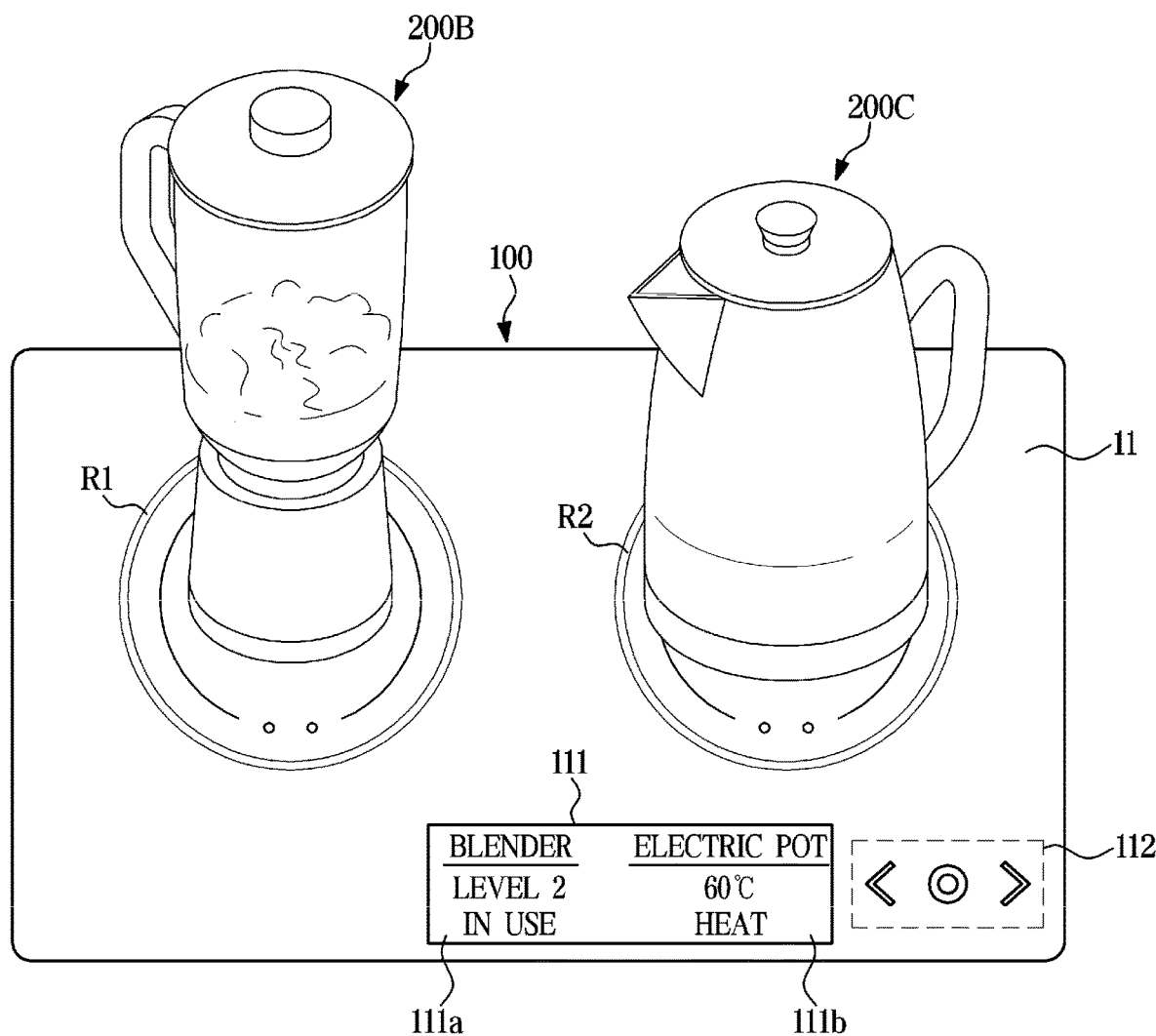
FIG. 28 is a view illustrating a case in which a plurality of small appliances is arranged in the wireless power transmission apparatus according to an embodiment of the disclosure.
Figure 30:
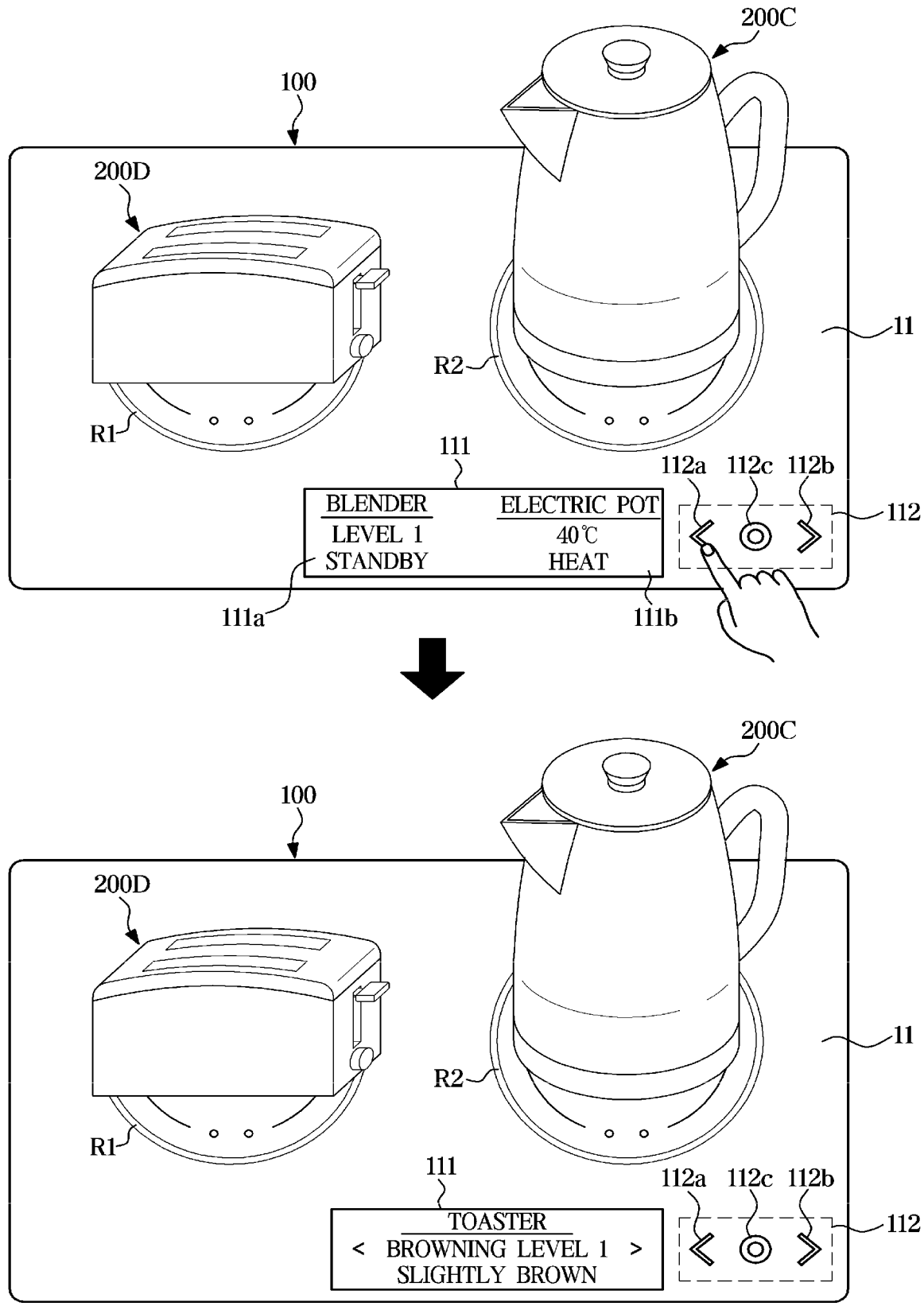
FIG. 30 is a view illustrating the case in which a plurality of small appliances is arranged in the wireless power transmission apparatus according to an embodiment of the disclosure.

FIGS. 28 to 30 are views illustrating a case in which a plurality of small appliances is arranged in the wireless power transmission apparatus.

As illustrated in FIG. 28, the plurality of small appliances, such as the blender 200B and the electric port 200C, may be arranged on the plate 11 of the wireless power transmission apparatus 100. The blender 200B and the electric port 200C may be arranged in each of the driving regions R1 and R2.

The wireless power transmission apparatus 100 may recognize the blender 200B and the electric port 200C using the NFC reader provided in each of the driving regions R1 and R2. The display 111 may divide the screen into two regions, and display information about the blender 200B on one divided screen 111a and information about the electric port 200C on the other divided screen 111b.

In this case, a position at which information about the blender 200B is displayed in the display 111 may correspond to a position where the blender 200B is arranged on the plate 11. Similarly, a position at which information about the electric port 200C is displayed in the display 111 may correspond to a position where the electric port 200C is arranged on the plate 11.

The information about the electric port 200C or the information about the blender 200B displayed on the display 111 may include information about an operating condition thereof, and information about whether the blender 200B and the electric port 200C are in use or not. In response to the use of the blender 200B and the electric pot 200C being included in the cooking step of the recipe, the controller 120 may automatically set operating conditions thereof according to the cooking step of the recipe.

FIGS. 29 and 30 are views illustrating a case in which a user sets operating conditions of a plurality of small appliances arranged in the wireless power transmission apparatus.

In examples of FIGS. 29 and 30, the toaster 200D and the electric port 200C are illustrated as an example of small appliances arranged in the wireless power transmission apparatus 100.

Referring to FIG. 29, in response to the toaster 200D being arranged in one driving region R1 among the plurality of driving regions R1, the wireless power transmission apparatus 100 may recognize the toaster 200D using the NFC reader, and may display a screen for setting the operating conditions of the toaster 200D on the display 111.

In response to the electric port 200C being placed in another driving region R2 by the user without setting the operating conditions of the toaster 200D, a screen for setting the operating conditions of the electric port 200C may be displayed on the display 111.

The user may set an operating condition by manipulating the inputter 112 and input an operation execution command according to the set operating condition. For example, the user may reduce a heating temperature of the electric pot 200C by selecting the first button 112a and increase the heating temperature of the electric pot 200C by selecting the second button 112b. Further, by selecting the third button 112c, the user may input an operation execution command according to a currently set operating condition.

In response to the operation execution command being input, information about the current operation of the electric port 200C may be displayed on the screen 111b at a position corresponding to the electric port 200C, and information indicating that the toaster 200D is currently on standby may be displayed on the screen 111a at a position corresponding to the toaster 200D, as illustrated in FIG. 30.

The user may manipulate the inputter 112 to switch the screen of the display 111 to a screen for setting operating conditions of the toaster 200D. As illustrated in FIG. 30, in response to information about the toaster 200D being displayed on the left screen 111a of the display 111, the user may select the first button 112a indicating the left direction to switch the screen to the screen for setting operating conditions of the toaster 200D.

The examples described so far are examples when assuming a specific situation in order to particularly describe the operation of the wireless power transmission apparatus 100 and other home appliances 200, 400, 500, and 600 and the mobile device 300 connected through the network. Operations performed by each device may vary according to the selected recipe, and it is possible to use the wireless power transmission apparatus 100 together with other home appliances 200, 400, 500, and 600 regardless of the recipe.

Hereinafter a cooking management method according to an embodiment will be described. The cooking management method uses the wireless power transmission apparatus 100, and the above-described contents regarding the wireless power transmission apparatus 100 are equally applicable to the cooking management method according to an embodiment, even if there is no separate mention.

Figure 31:
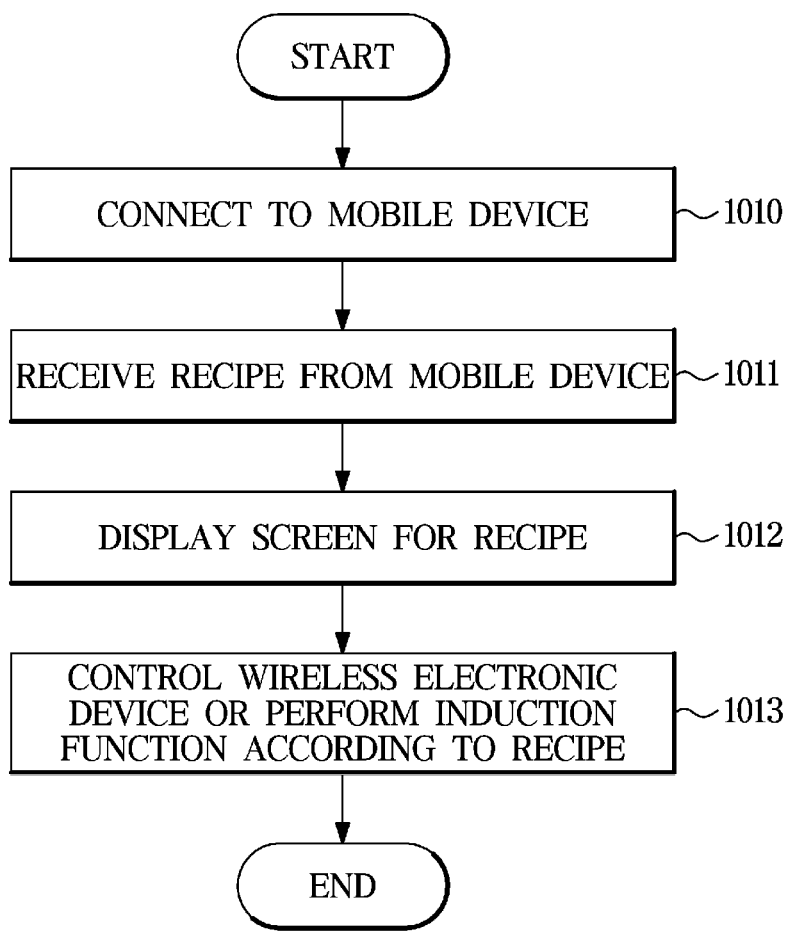
FIG. 31 is a flowchart illustrating a cooking management method using the wireless power transmission apparatus according to an embodiment of the disclosure.

FIG. 31 is a flowchart illustrating a cooking management method using the wireless power transmission apparatus according to an embodiment of the disclosure.

Referring to FIG. 31, the wireless power transmission apparatus 100 is connected to the mobile device 300 (1010). For example, in response to the mobile device 300 being mounted on the cradle 101 of the wireless power transmission apparatus 100, the wireless power transmission apparatus 100 and the mobile device 300 may be connected through a wireless communication method such as Bluetooth or Wi-Fi, and be in a state of exchanging necessary information with each other.

The wireless power transmission apparatus 100 receives a recipe from the mobile device 300 (1011). As illustrated in FIG. 15, the display 311 of the mobile device 300 may display a guide screen for guiding the selection of one in the recommended dishes list generated by the server 400.

The inputter 312 of the mobile device 300 may receive a user input for selecting one dish included in the recommended dishes list. In addition, in response to the send button to the wireless power transmission apparatus being selected after the dish is selected, the communication circuitry 330 may transmit the selected recipe of the dish to the wireless power transmission apparatus 100. Alternatively, in response to the mobile device 300 being mounted on the cradle 101 of the wireless power transmission apparatus 100, the recipe may be automatically transmitted from the mobile device 300 to the wireless power transmission apparatus 100.

A screen regarding the received recipe is displayed on the display 111 of the wireless power transmission apparatus 100 (1012). The screen related to the recipe means a screen representing the recipe. The recipe may be composed of a plurality of cooking steps, and a screen for each of the plurality of cooking steps may be sequentially displayed on the display 111.

In order to display the screen related to the recipe, the controller 120 of the wireless power transmission apparatus 100 may generate summary information summarizing the recipe in consideration of the size of the display 111, and display the summary information on the display 111.

Meanwhile, in displaying the recipe-related screen, the screen displayed on the display 111 of the wireless power transmission apparatus 100 and the screen displayed on the display 311 of the mobile device 300 may interwork with each other. For example, in response to the screen displayed on the display 111 of the wireless power transmission apparatus 100 being switched, the screen displayed on the display 311 of the mobile device 300 may also be switched correspondingly. Conversely, in response to the screen displayed on the display 311 of the mobile device 300 being switched, the screen displayed on the display 111 of the wireless power transmission apparatus 100 may also be switched correspondingly.

In order to switch the screen, the movement command from the current cooking step to the next cooking step or the screen switching command may be transmitted from the wireless power transmission apparatus 100 to the mobile device 300 or from the mobile device 300 to the wireless power transmission apparatus 100.

The wireless power transmission apparatus 100 controls the wireless electronic device 200 or performs an induction function according to the received recipe (1013). For example, in response to the wireless electronic device 200 such as the electronic cutting board 200A being arranged in the driving region R of the wireless power transmission apparatus 100, the controller 120 controls the driving circuit 140 to transmit wireless power through the transmitting coil while being connected to the wireless electronic device 200 through a wireless communication method such as Bluetooth or Wi-Fi. The wireless power transmission apparatus 100 may generate and transmit a signal for controlling the wireless electronic device 200 according to the recipe as in the above-described embodiment.

In addition, based on the recipe including a heating step of a material using a cooking vessel, the wireless power transmission apparatus 100 may perform an induction function. Using a sensor provided on the plate 11, the arranged cooking vessel may be recognized, and the intensity of induction may be automatically set according to the recipe. In the state in which the plurality of driving regions R is provided, the controller 120 may recognize the driving region in which the cooking vessel is arranged, and control the driving circuit 140 to provide a current to the transmitting coil 152 corresponding to the driving region, in which the cooking vessel is arranged.

Alternatively, in response to an operation, which is to be performed for a predetermined time, being included in the current cooking step according to the recipe, the wireless power transmission apparatus 100 may execute a timer function. The controller 120 may count a predetermined time according to the recipe, and display the lapse of time on the display 111. In response to the completion of the count, it may be visually output on the display 111 or may be output audibly to a speaker.

Figure 32:
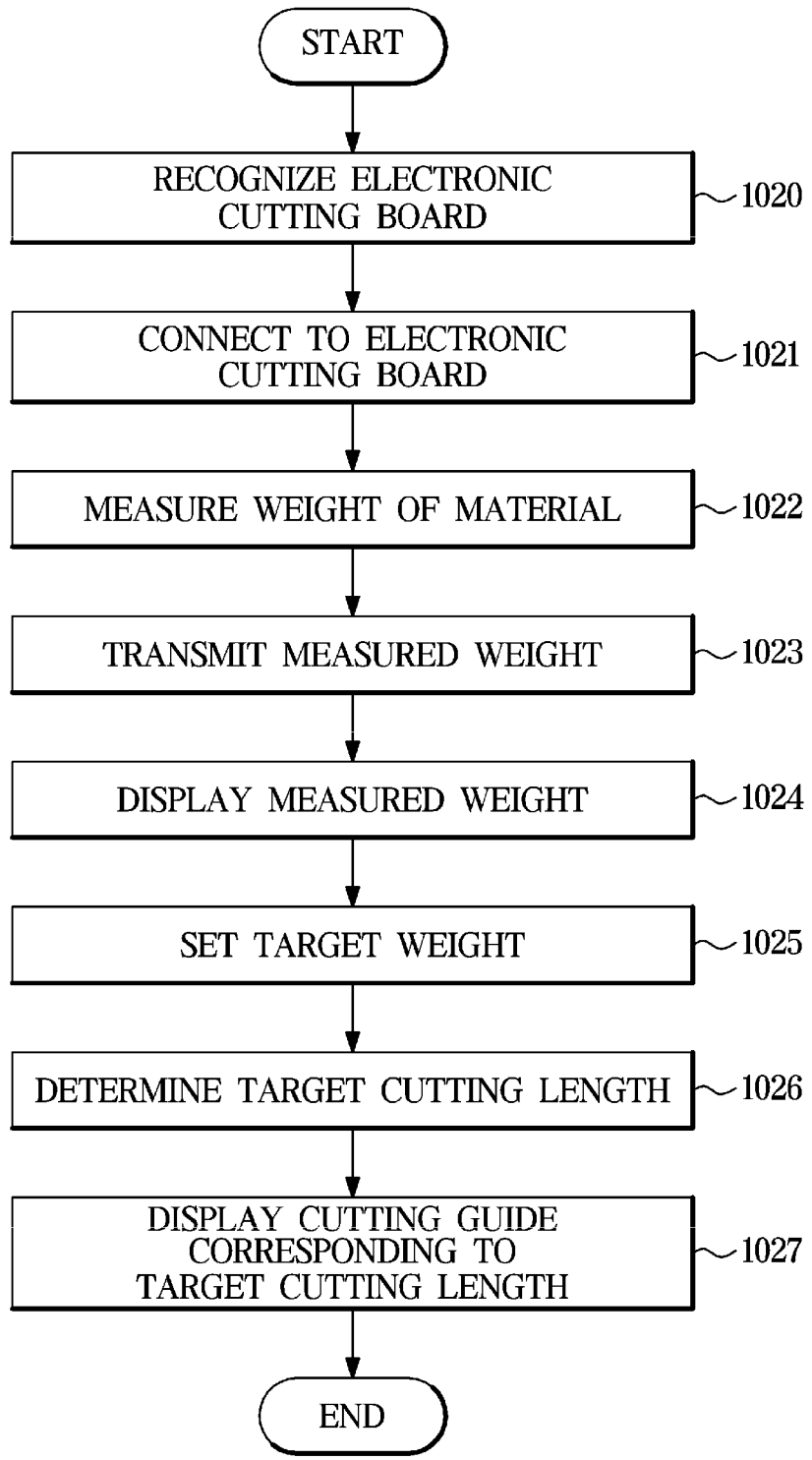
FIG. 32 is a flowchart illustrating a cooking management method using the electronic cutting board in the cooking management method according to an embodiment of the disclosure.

FIG. 32 is a flowchart illustrating a cooking management method using an electronic cutting board in the cooking management method according to an embodiment of the disclosure.

Referring to FIG. 32, in response to the electronic cutting board 200A being arranged in the driving region R of the wireless power transmission apparatus 100, the wireless power transmission apparatus 100 may recognize the electronic cutting board 200A (1020), and may be connected to the electronic cutting board 200A through a wireless communication method such as the Bluetooth and Wi-Fi (1021). For example, the NFC reader included in the communication circuitry 130 of the wireless power transmission apparatus 100 may obtain identification information included in the NFC tag included in the communication circuitry 230 of the electronic cutting board 200A. The controller 120 of the wireless power transmission apparatus 100 may recognize the electronic cutting board 200A based on the obtained identification information.

In addition, the wireless power transmission apparatus 100 may transmit wireless power through the transmitting coil 150 by controlling the driving circuit 140, and the power receiver 250 of the electronic cutting board 200A may receive wireless power and supply the necessary power to each component.

The electronic cutting board 200A may use the weight sensor 241 to measure the weight of the material arranged on the plate 201A (1022).

The measured weight may be transmitted from the electronic cutting board 200A to the wireless power transmission apparatus 100 (1023), and the wireless power transmission apparatus 100 may display the measured weight on the display 111 (1024).

A target weight for the material may be set (1023). The target weight of the material may be set based on a recipe received from the mobile device 300 or may be set based on a user input received by the inputter 112.

A target cutting length is determined based on the target weight and the measured weight (1026). For example, the controller 220 of the electronic cutting board 200A may determine the target cutting length of the material based on the difference between the target weight and the measured weight. The target cut length indicates the length that is cut to reduce the weight of the material to the target weight. Alternatively, the target cutting length may be determined by the controller 120 of the wireless power transmission apparatus 100.

The electronic cutting board 200A displays a cutting guide corresponding to the target cutting length (1027). The cutting guide may include a graphic object provided to guide the material to be cut by the target cutting length. For example, when the display 211 displays scales at predetermined intervals, the display 211 may display only scales indicating the target cutting length interval, display the scales darker than other scales, or display the scales in a different color. For example, in response to displaying each scale by the LEDs individually controlled, only the LED of the scale indicating the target cutting length may be turned on and the remaining LEDs may be turned off.

FIG. 33 is a flowchart illustrating a cooking management method using the electronic cutting board in the cooking management method according to an embodiment.

The description of the process from the recognition 1020 of the electronic cutting board 200A to the setting of the target weight 1025 is the same as described above.

The electronic cutting board 200A may further include the touch sensor 242 provided on the plate 201A, and the contact between the material and the plate 201A may be detected by the touch sensor 242 (1030). An output of the touch sensor 242 may indicate an area of the material.

The display 211 of the electronic cutting board 200A may display the area of material on the plate 201A based on the output of the touch sensor 242 (1031). For example, scales corresponding to opposite ends of the material may be displayed, and scales between the scales may be displayed together therewith.

In determining of the target cutting length (1026), the output of the touch sensor 242 may be used together. That is, the controller 220 may determine the target cutting length based on the difference between the target weight and the measured weight, and the output of the touch sensor 242.

According to the above-described embodiment, a seamless cooking experience may be provided to a user by integrally managing the selection of a recipe and the entire cooking process according to the selected recipe from the moment food materials are stored in a refrigerator.

In addition, by allowing home appliances to interwork with each other and integrally controlling the home appliances required for cooking, it is possible to reduce user fatigue and improve convenience.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. An electronic cutting board, comprising:
   a power receiver configured to receive power from a wireless power transmission apparatus;
   a communication circuitry configured to communicate with the wireless power transmission apparatus, the wireless power transmission apparatus being configured to receive recipe information from a mobile device and transmit the recipe information received from the mobile device to the communication circuitry;
   a plate comprising a display and a protective cover to protect the display;
   a weight sensor configured to measure a weight of an object while the object is placed on the plate; and
   a controller configured to control the display of the plate to display a cutting guide based on the measured weight and the recipe information received based on communication of the communication circuitry with the wireless power transmission apparatus which includes a display interworked with a screen displayed on the mobile device so as to switch to displaying information associated with the object placed on the plate based on one of the wireless power transmission apparatus and the mobile device displaying the information associated with the object according to a request.

2. The electronic cutting board of claim 1, wherein the recipe information comprises a target weight of the object,
   wherein the controller is configured to determine a target cutting length of the object based on a difference between the measured weight and the target weight, and configured to control the display to display the target cutting length.

3. The electronic cutting board of claim 2, further comprising:
   a touch sensor arranged on an upper portion of the display and configured to detect a contact of the plate with the object placed on the plate;
   wherein the controller is configured to determine the target cutting length of the object based on a difference between the measured weight, the target weight and an output of the touch sensor.

4. The electronic cutting board of claim 3, wherein the display is configured to display a plurality of scales spaced apart by a predetermined interval, wherein the controller is configured to determine a position of a scale for displaying the cutting guide among the plurality of scales based on the output of the touch sensor.

5. A wireless power transmission apparatus, comprising:
a plate on an upper portion of the wireless power transmission apparatus;
a transmitting coil configured to transmit power to a wireless electronic device while the wireless electronic device is placed on the plate, the transmitting coil being configured to heat a cooking vessel while the cooking vessel is placed on the plate;
a communication circuitry configured to receive a recipe from a mobile device while the mobile device is connected to the wireless power transmission apparatus;
a display configured to display a screen;
an inputter configured to receive a user input; and
a controller configured to control the communication circuitry and the display such that the screen displayed on the display of the wireless power transmission apparatus and a screen displayed on the mobile device are interworked with each other to switch to displaying information associated with an object placed on the plate based on one of the wireless power transmission apparatus and the mobile device displaying the information associated with the object according to a request.

6. The wireless power transmission apparatus of claim 5, wherein
the display is configured to sequentially display a screen indicating a plurality of cooking steps constituting the recipe.

7. The wireless power transmission apparatus of claim 6, wherein
the controller is configured to control the communication circuitry to transmit a command, so that a current cooking step is moved to a next cooking step among the plurality of cooking steps, to the mobile device,
wherein the command is transmitted to the mobile device based on the user input corresponding to the command being received or based on a predetermined condition being satisfied.

8. The wireless power transmission apparatus of claim 7, wherein
based on receiving the command from the mobile device, the controller is configured to control the display to display the next cooking step.

9. The wireless power transmission apparatus of claim 7, wherein
based on an operation, which is performed for a predetermined time, being contained in the current cooking step among the plurality of cooking steps, the controller is configured to control the display to execute a timer function.

10. The wireless power transmission apparatus of claim 5, wherein
based on an electronic cutting board being placed on the plate, the controller is configured to control the communication circuitry to transmit a target weight of the object to the electronic cutting board based on the recipe,
wherein based on receiving a weight of the object measured by a weight sensor from the electronic cutting board, the controller is configured to control the display to display the weight measured.

11. The wireless power transmission apparatus of claim 6, wherein
the controller is configured to control the display to display information about a wireless electronic device or a cooking vessel involving a current cooking step among the plurality of cooking steps.

12. A cooking management method using a wireless power transmission apparatus, comprising:
connecting the wireless power transmission apparatus to a mobile device;
receiving a recipe, from the mobile device, by the wireless power transmission apparatus;
displaying a screen on a display of the wireless power transmission apparatus; and
controlling the screen displayed on the display of the wireless power transmission apparatus to interwork with a screen displayed on the mobile device such that while one of the screen of wireless power transmission apparatus and the screen displayed on mobile device is displaying information associated with an object, another one of the screen of the wireless power transmission apparatus and the screen displayed on the mobile device is switched to displaying the information.

13. The cooking management method of claim 12, wherein
the displaying of the screen related to the recipe comprises sequentially displaying a plurality of cooking steps constituting the recipe,
wherein the screen displayed on the display of the wireless power transmission apparatus and the screen displayed on the mobile device interwork with each other where a command is transmitted to the mobile device so that a current cooking step is moved to a next cooking step among the plurality of cooking steps.

14. The cooking management method of claim 13, wherein
the screen displayed on the display of the wireless power transmission apparatus and the screen displayed on the mobile device interwork with each other where the command is transmitted to the mobile device based on a user input being received corresponding to the command or based on a predetermined condition being satisfied.

15. The cooking management method of claim 13, wherein
the screen displayed on the display of the wireless power transmission apparatus and the screen displayed on the mobile device interwork with each other to display the next cooking step based on receiving the command from the mobile device.

* * * * *